United States Patent
Takahashi et al.

(10) Patent No.: US 6,574,229 B1
(45) Date of Patent: Jun. 3, 2003

(54) WIDE AREA LOAD DISTRIBUTION APPARATUS AND METHOD

(75) Inventors: Eiichi Takahashi, Kawasaki (JP); Takeshi Aoki, Kawasaki (JP); Shinji Kikuchi, Kawasaki (JP); Tetsuya Okano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/295,365

(22) Filed: Apr. 21, 1999

(30) Foreign Application Priority Data

Oct. 23, 1998 (JP) .......................................... 10-302009

(51) Int. Cl.[7] .......................... H04L 12/56; G06F 13/00
(52) U.S. Cl. ........................ 370/400; 370/466; 709/105
(58) Field of Search ................................ 370/400–408, 370/389, 392, 466, 465; 709/105, 229

(56) References Cited

U.S. PATENT DOCUMENTS

| | | | |
|---|---|---|---|
| 5,341,477 A | | 8/1994 | Pitkin et al. |
| 5,774,660 A | * | 6/1998 | Brendel et al. ............. 709/105 |
| 5,774,668 A | | 6/1998 | Choquier et al. |
| 6,055,574 A | * | 4/2000 | Smorodinsky et al. ...... 709/104 |
| 6,061,349 A | * | 5/2000 | Coile et al. .................. 370/401 |
| 6,249,801 B1 | * | 6/2001 | Zisapel et al. ............... 709/105 |
| 6,259,705 B1 | * | 7/2001 | Takahashi et al. ........... 370/401 |

OTHER PUBLICATIONS

Search Report from related EP Application No. 99303468 dated May 3, 2002.

* cited by examiner

*Primary Examiner*—Steven Nguyen
(74) *Attorney, Agent, or Firm*—Staas & Halsey LLP

(57) ABSTRACT

When service is allocated to a server of the other network on the basis of load information, a packet from a client is transferred as a transfer packet to the other wide area load distribution apparatus. The other wide area load distribution apparatus fetches the client packet from the transfer packet and converts its destination from a transferor address Lx to a server address S and its sender from a client address C to a self address Ly for sending to a server. Upon a reception of a response server packet from the server, the destination is converted from the self address Ly to the client address C and the sender is converted from the server address S to the transferor address Lx for the relay to the client.

9 Claims, 26 Drawing Sheets

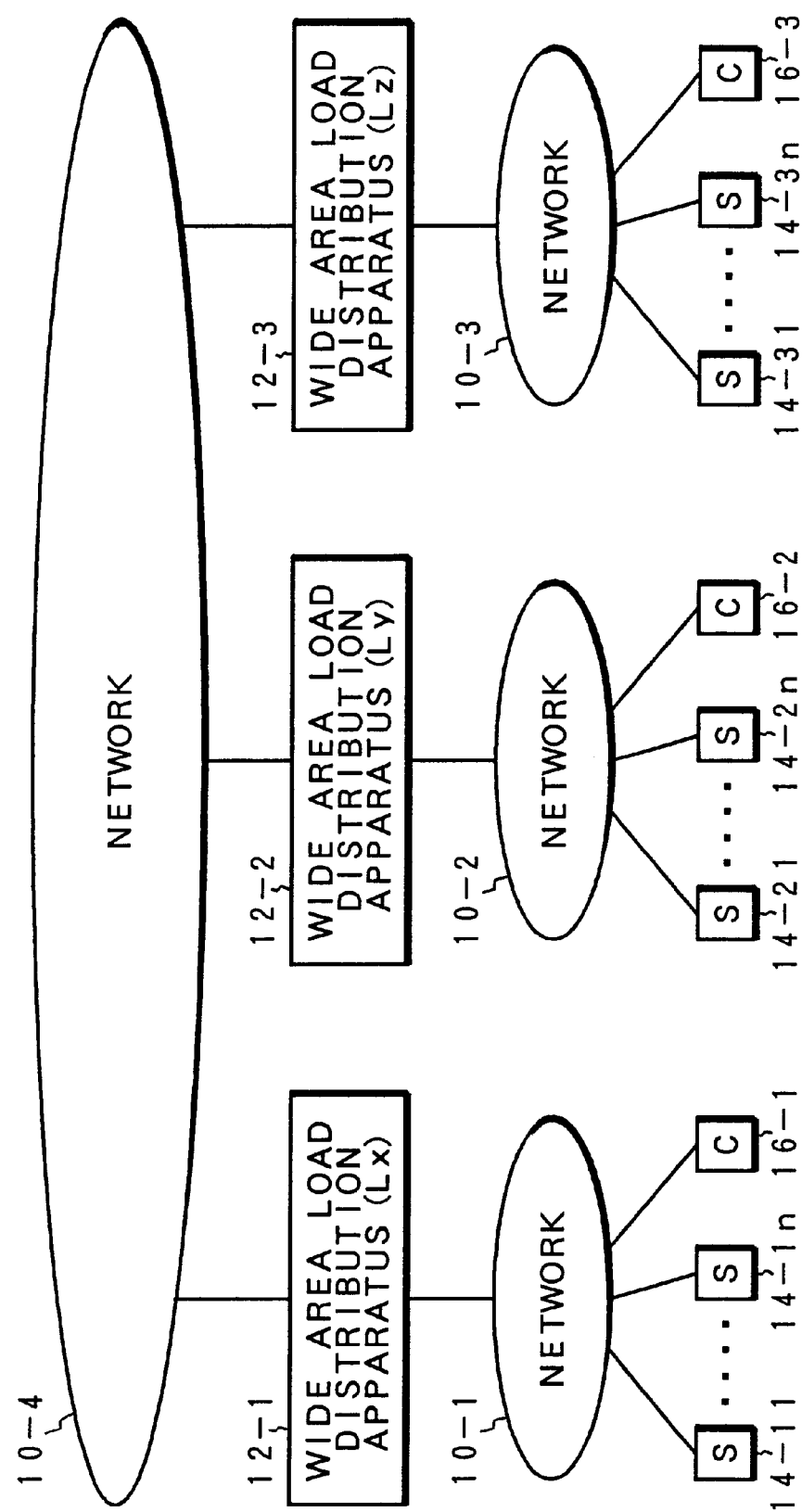

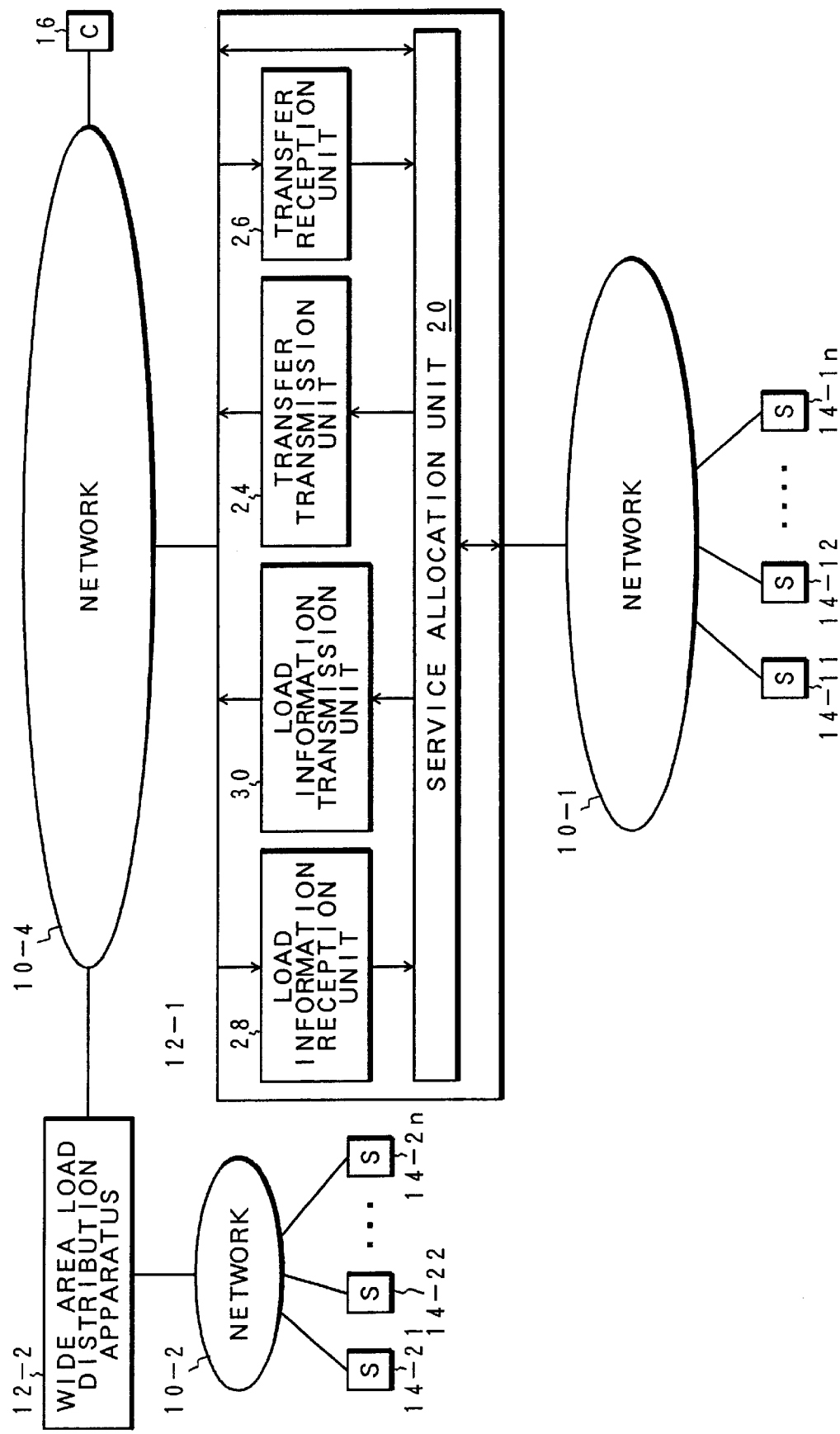

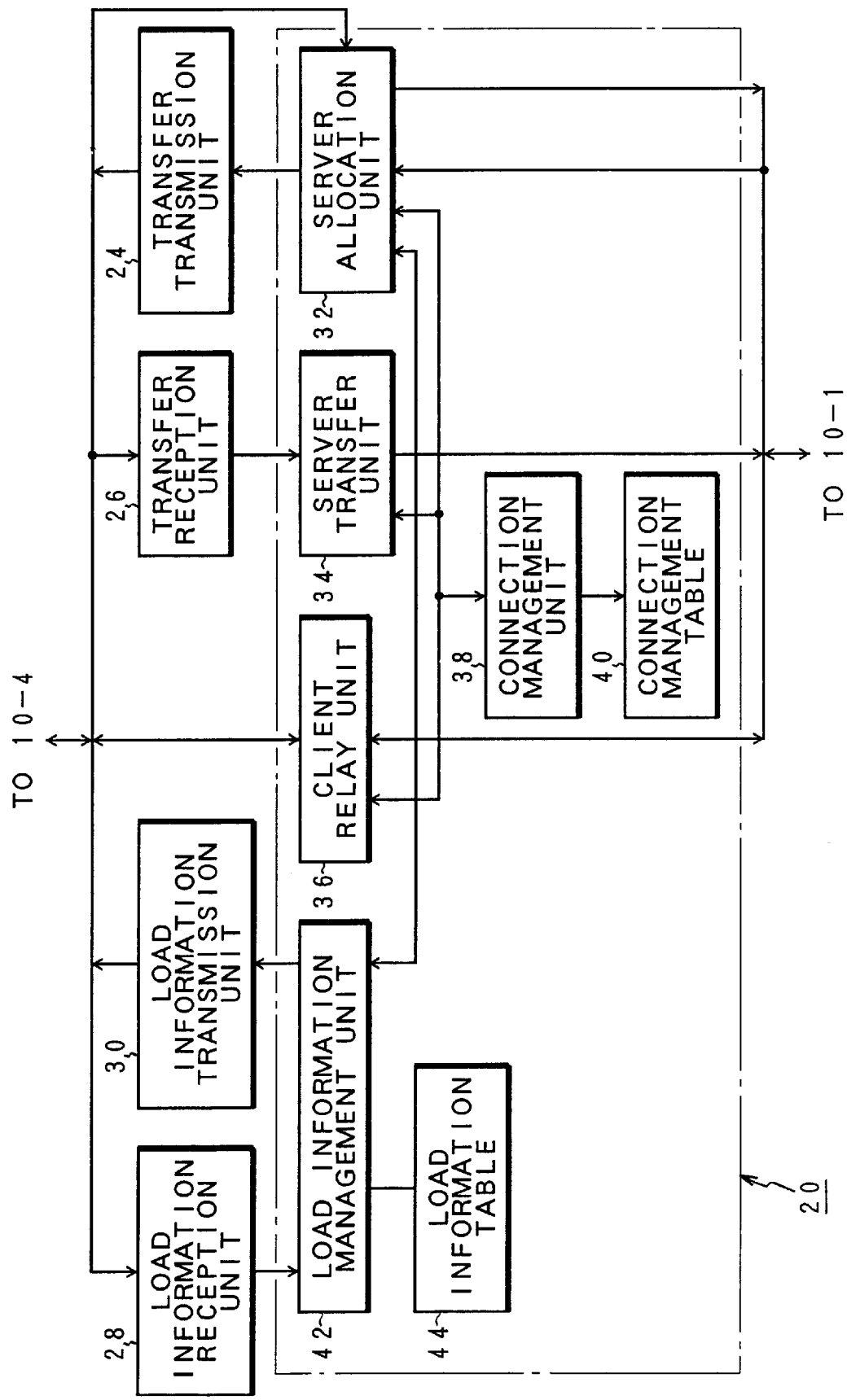

F I G. 1 1 A
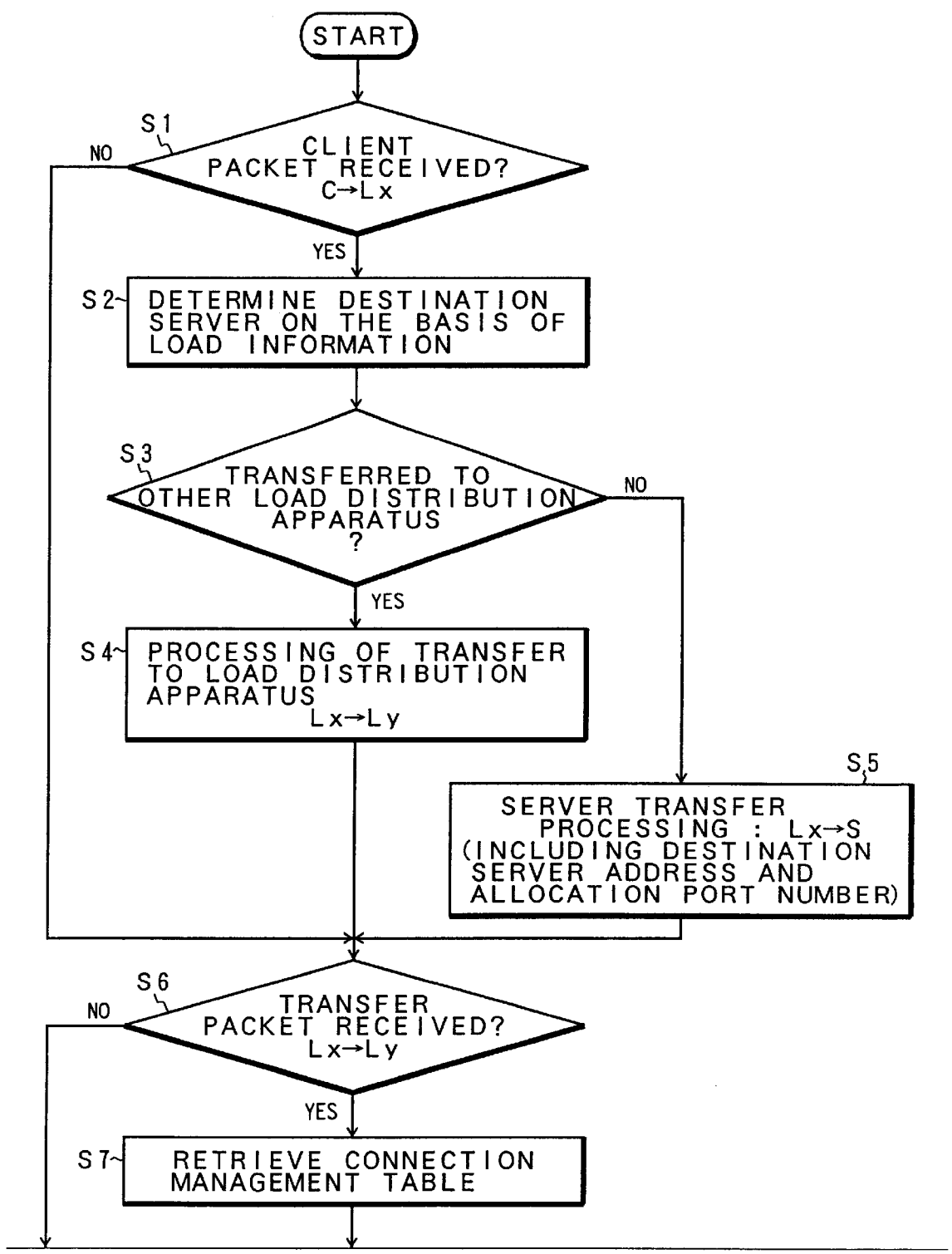

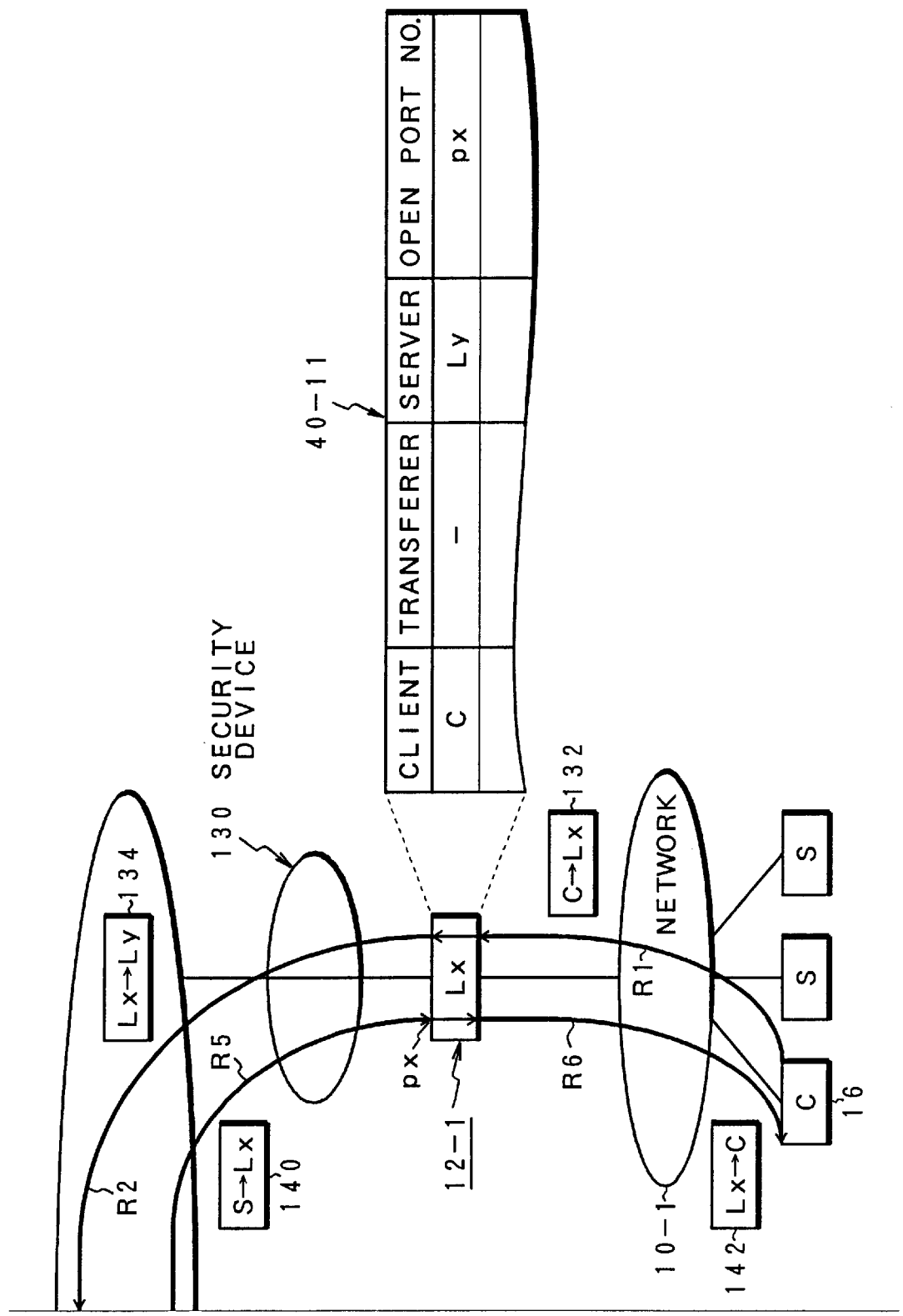

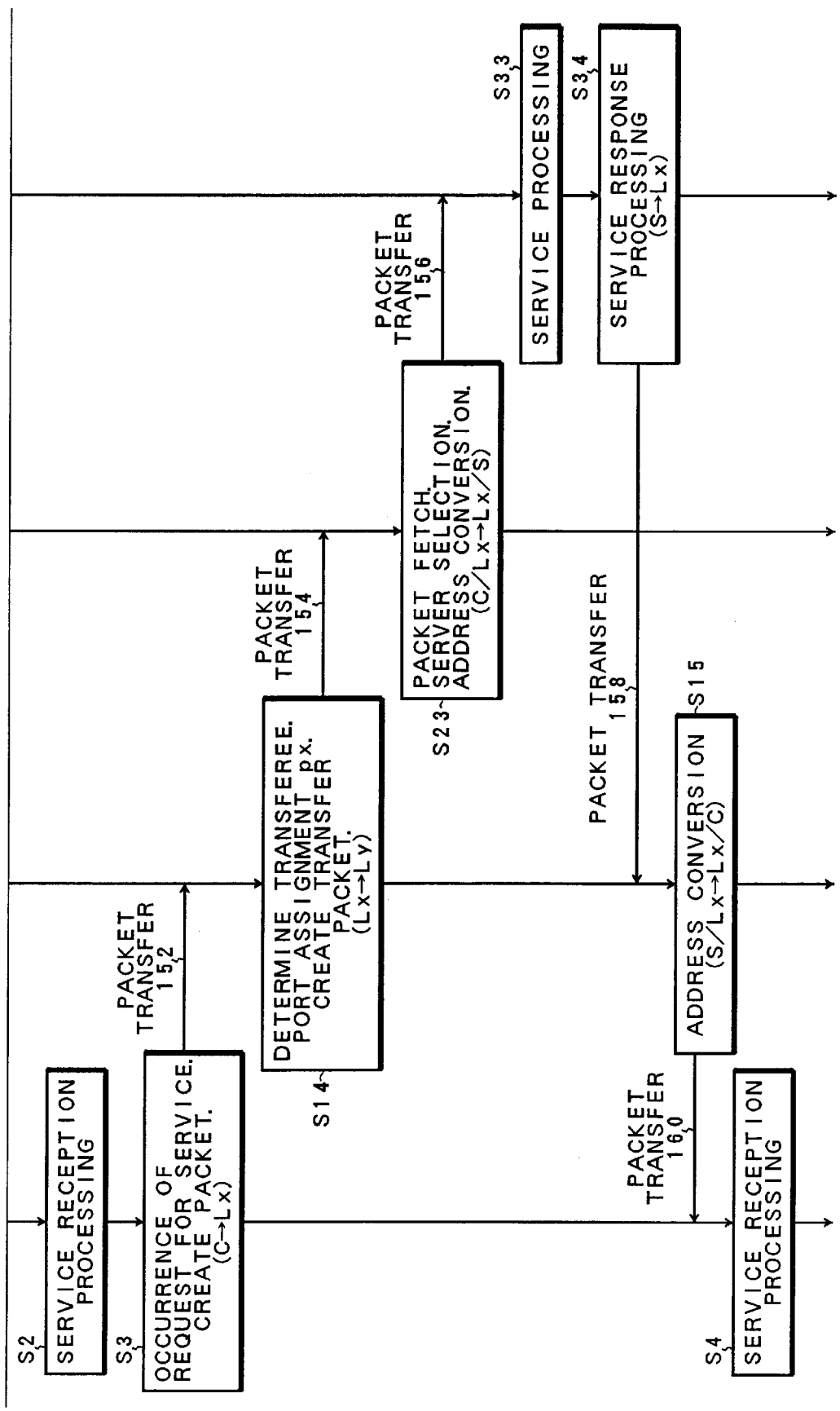

WIDE AREA LOAD DISTRIBUTION APPARATUS AND METHOD

BACKGROUND OF THE INVENTION

1. Field of the Invention

The present invention relates generally to a wide area load distribution apparatus and method for allocating services provided to clients by a plurality of servers, depending on the states of load of the servers, and more particularly to a wide area load distribution apparatus and method in which the servers belonging to different networks are subjected to load distribution.

2. Description of the Related Arts

A recent rapid prevalence of internet and intranet is increasing a demand for effective utilization of servers providing network services and for service stability. An optimum service allocation for avoiding any access concentration to a specific server is indispensable for the effective utilization of the servers and stable service provision, so that a load distribution method for allocating the services depending on the state of load of the servers is desired.

Hitherto known as the load distribution method for performing service allocation depending on the server load state are a method utilizing a domain name system (hereinafter, referred to as DNS) and a method utilizing an virtual server. The method utilizing DNS is a method in which a plurality of DNSs are arranged in each network area in a distributed manner and in which an optimum server IP address is correlated with a domain name for each network area. Each DNS allows a single domain name to be correlated with a plurality of IP addresses so that a round robin selects an IP address for the transfer to the client. More specifically, when a client sends a domain name, e.g., "www, flab, fujitsu, co jp" to a DNS arranged in an area to which the client belongs, the DNS which has received the domain name makes an access to a most significant first layer DNS lying outside the area, then to a DNS of each layer, i.e., from the first layer to a second layer, from the second layer to a third layer, and further from the third layer to a fourth layer. The client acquires a server IP address from the fourth layer DNS for sending. This IP address from the fourth layer DNS is cached by the DNS of the network to which the client belongs. When the same domain name is then received from another client, an IP address response is issued due to the cache hit. In the method utilizing the virtual server, a virtual server is disposed in front of a plurality of servers so that all the accesses from the clients pass through the virtual server, which allocates and relays service demands from the clients in ratios depending on the state of load of the servers. Known as this virtual server method is for example "UXP/DS InfoDispatcher" supplied by Fujitsu Ltd.

A load distribution mechanism for use in the method utilizing the virtual server is described in for example I) "4T-01 Smart Scatter: Internet/Intranet Load Distribution Mechanism—General Configuration and Control Part—" 55th Information Processing National Conference Trans. 1997, by Satoru HOSOI, Eiichi TAKAHASHI, Takuya YAMADA, Koichi TAKABASHI, Motomitsu ADACHI; and II) "4T-2 Smart Scatter: Internet/Intranet Load Distribution Mechanism—Packet Allocation Part—" 55th Information Processing National Conference Trans. 1997, by Yuji IMAI, Hiromitsu KISHIMOTO, Koichi TAKABASHI, Tsunehiko YAHAGI.

In the conventional load distribution method utilizing the DNS, however, among the externally provided first to fourth layer DNSs the fourth layer DNS manages the IP addresses of a plurality of servers for the domain name, so that if a response of only one IP address among them is made, this is cached in the DNS associated with the client. This allows the accesses to be concentrated to one server cached in the DNS, preventing the load distribution. Furthermore, the clients are fixed on an area to area basis, so that there must be estimated the number of clients in order to provide sufficient services. In the load distribution method utilizing the virtual server on the other hand, there are found no measures for the cases where all the servers to be subjected to the load distribution are in high load or at a stop. Furthermore, accordingly as the network scale becomes larger, the number of the servers to be subjected to the load distribution will increase, with the result that the accuracy of the load measurement of the servers belonging to the other network remote from the load distribution apparatus may lower. Thus, the load distribution apparatus itself may possibly become a bottleneck, preventing an appropriate load distribution, and imposing a restriction on the servers to be subjected to the load distribution.

SUMMARY OF THE INVENTION

According to a first aspect of the present invention there is provided a wide area load distribution apparatus and method ensuring a proper load distribution and failure concealment among servers belonging to different networks.

The present invention provides a wide area load distribution apparatus which allocates services provided to clients by a plurality of servers existing in the different networks, depending on the state of load of the servers. The wide area load distribution apparatus comprises a transfer transmission unit, a transfer reception unit, a server allocation unit, a server transfer unit, a client relay unit, a connection management unit and a load information management unit.

The server allocation unit allocates a service for a client packet from a client to a server of its own network or a server of the other network which is selected on the basis of load information.

The transfer transmission unit creates a transfer packet containing the client packet in the form of transfer data when the server allocation unit allocates the service to the server of the other network, to transfer the transfer packet by a predetermined transfer protocol to a wide area load distribution apparatus of the other network.

The transfer reception unit fetches the client packet from the transfer packet when the transfer packet is received from a wide area load distribution apparatus of said the other network. The server transfer unit converts the destination of the client packet fetched by the transfer reception unit from a transferor wide area load distribution apparatus address to a server address and converts the sender from a client address to a self address for sending the packet to the server.

The client relay unit converts the destination of a server packet which is a response to a transferred service from a server, from a self address to a client address and converts the sender from a server address to a transferor wide area load distribution apparatus address for relaying the packet to the client.

Furthermore, the connection management unit holds for each service a correlation for retrieval among a client, a transferee and a server for a packet processed by the server allocation unit, the transfer transmission unit, the transfer reception unit, the server transfer unit and the client transfer unit.

Such a wide area load distribution apparatus enables the servers belonging to different networks to be subjected to load distribution without impairing the service consistency, with the result that the sites of arrangement of the servers to be subjected to the load distribution can freely be determined.

Furthermore, the protocol for use in the transfer can freely be determined, so that it becomes possible to enhance the flexibility and efficiency including the addition of additional information to the transfer packet and continuous establishment of connection for the transfer.

According to a second aspect of the present invention, there is solved a problem that the service may possibly be excluded by a security device for checking incorrect addresses since the sender address of the response packet to the client from the wide area load distribution apparatus is Lx, instead of a correct sender address Ly.

The wide area load distribution apparatus comprises a transfer transmission unit, a transfer reception unit, a server allocation unit, a server transfer unit, a client relay unit, a connection management unit and a load information management unit. Among them, the server allocation unit, transfer transmission unit and transfer reception unit for transferring a service demand from a client to a server of the other network are the same, whereas the server transfer unit for allocating the transfer packet to the server and the client relay unit for relaying the response packet of the transferred service from the server to the client are different from those of the first aspect.

The server allocation unit allocates a service for a client packet from a client to a server of its own network or a server of the other network which is selected on the basis of load information.

The transfer transmission unit creates a transfer packet containing the client packet in the form of transfer data when the server allocation unit allocates the service to the server of the other network, to transfer the transfer packet by a predetermined transfer protocol to a wide area load distribution apparatus of the other network, with the client packet being fetched from the transfer packet in the transferee transfer reception unit.

In response to this, the server transfer unit converts the destination of the client packet fetched by the transfer reception unit from a transferor wide area load distribution apparatus address to a server address and converts the sender from a client address to a transferor wide area load distribution apparatus address for sending to the server.

The client relay unit converts the destination of a server packet which is a response to a transferred service from a server, from a self address to a client address and converts the sender from a server address to a self address for relaying the packet to the client.

This aspect enables the servers belonging to different networks to be subjected to the load distribution without impairing the service consistency, with the result that the sites of arrangement of the servers to be subjected to the load distribution can freely be determined.

Furthermore, irrespective of the provision of the security device, the server 14 relays a packet with a correct destination address Lx and sender address S, so that the packet response can be transferred to the client without any problem caused by the security device for detecting the incorrect address.

The connection management unit has a connection management table into which a correlation among a client, a transferor and a server is entered for each service, and upon the reception of a transfer packet in the server transfer unit, it enters a correlation among a sender client address of a client packet fetched from the transfer packet, a transferor apparatus address and a destination server address into the connection management table.

For this reason, upon the reception of a transfer packet, the server transfer unit retrieves the connection management table from a sender client address C and a transferor apparatus address Lx of a client packet fetched from the transfer packet, to thereby acquire a destination server address S.

In case the server transfer unit has failed to acquire the destination server address as a result of retrieval of the connection management table, it selects a new destination server on the basis of the load information.

When the server transfer unit has selected a new destination server on the basis of the load information, the connection management unit newly enters into the connection management table a correlation among a sender client address C and a transferor apparatus address Lx of a client packet fetched from the transfer packet, and a destination server address S selected from the load information.

Utilizing the load information of the transfer packet, the server transfer unit provides the transfer packet with flag information indicative of a service connection demand or in-service, and the server transfer unit when recognizing the service connection demand from the flag information of the relay packet, acquires a new destination server on the basis of load information without retrieving the connection management table, whereas when recognizing in-service from the flag information of the relay packet, it acquires a destination server through the retrieval of the connection management table.

This will eliminate the need for the retrieval of the connection management table upon the packet transfer of a service demand from a client to the other network server, thereby reducing the processing burden of the wide area load distribution apparatus.

The load information management unit sends self load information to a load allocation instruction apparatus which collects load information from a plurality of wide area load distribution apparatuses for collective management, the load information management unit acquiring load information of the other wide area load distribution apparatuses from the load allocation instruction apparatus. It is thus possible through the transmission and acquisition of the load information to prevent the network load from increasing and through the centralized management of the load information to reduce the management cost and enhance the flexibility and extensibility.

According to a third aspect of the present invention there is provided a wide area load distribution method in which each network is provided with a wide area load distribution apparatus and in which services provided to clients by a plurality of servers existing in different networks are allocated depending on the state of load of the servers.

The wide area load distribution method comprises:

a server allocation step for allocating a service for a client packet from a client to a server of its own network or a server of the other network which is selected on the basis of load information;

a transfer transmission step for creating a transfer packet containing the client packet in the form of transfer data when the service is allocated to the server of the other network in the server allocation step, to transfer the transfer packet by a predetermined transfer protocol to a wide area load distribution apparatus of the other network;

a transfer reception step for fetching the client packet from the transfer packet when the transfer packet is received from a wide area load distribution apparatus of said the other network;

a server transfer step for converting the destination of the client packet fetched in the transfer reception step from a transferor wide area load distribution apparatus address to a server address and for converting the sender from a client address to a self address for sending to the server;

a client relay step for converting the destination of a server packet which is a response to a transferred service from a server, from a self address to a client address and for converting the sender from a server address to a transferor wide area load distribution apparatus address for relaying to the client;

a connection management step for holding for each service a correlation for retrieval among a client, a transferee and a server for a packet processed in the server allocation step, the transfer transmission step, the transfer reception step, the server transfer step and the client transfer step; and a load information management step for interchanging for management the load information with the other wide area load distribution apparatus.

According to a fourth aspect of the present invention there is provided a wide area load distribution method which comprises:

a server allocation step for allocating a service for a client packet from a client to a server of its own network or a server of the other network which is selected on the basis of load information;

a transfer transmission step for creating a transfer packet containing the client packet in the form of transfer data when the service is allocated to the server of the other network in the server allocation step, to transfer the transfer packet by a predetermined transfer protocol to a wide area load distribution apparatus of said the other network;

a transfer reception step for fetching the client packet from the transfer packet when the transfer packet is received from a wide area load distribution apparatus of said the other network;

a server transfer step for converting the destination from a transferor wide area load distribution apparatus address to a server address and for converting the sender from a client address to a transferor wide area load distribution apparatus address for sending to the server;

a client relay step for converting the destination of a server packet which is a response to a transferred service from a server, from a self address to a client address and for converting the sender from a server address to a self address for relaying to the client;

a connection management step for holding for each service a correlation for retrieval among a client, a transferee and a server for a packet processed in the server allocation step, the transfer transmission step, the transfer reception step, the server transfer step and the client transfer step; and a load information management step for interchanging for management the load information with the other wide area load distribution apparatus.

The above and other objects, aspects, features and advantages of the present invention will become more apparent from the following detailed description with reference to the accompanying drawings.

BRIEF DESCRIPTION OF THE DRAWINGS

FIG. 1 is a configuration diagram of networks provided with wide area load distribution apparatuses of the present invention;

FIG. 2 is a block diagram of the wide area load distribution apparatus of the present invention;

FIG. 3 is a function block diagram of a service allocation unit in the wide area load distribution apparatus of FIG. 2;

FIGS. 11A and 11B are flowcharts of service allocation processing of FIGS. 5 and 6 effected by the wide area load distribution apparatus of the present invention;

FIGS. 16A and 16B are explanatory diagrams of the service allocation processing effected by the wide area load distribution apparatus of the present invention in case a security device for checking an incorrect address is disposed on a server packet transfer path extending from a transferred server;

FIGS. 17A and 17B are time charts of the service allocation processing of FIG. 16;

Figure 4A:
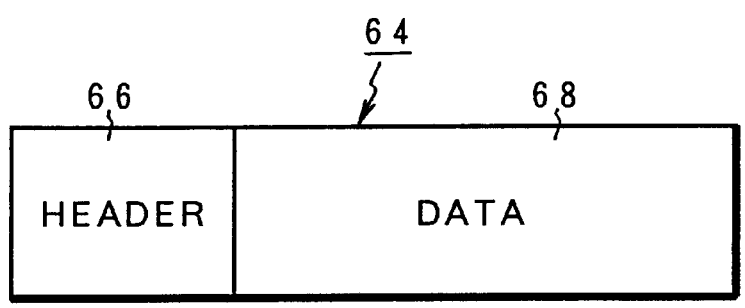
FIGS. 4A and 4B are explanatory diagrams of a connection information table of FIG. 2.

DETAILED DESCRIPTION OF THE PREFERRED EMBODIMENTS (Configuration and Functions of Apparatus)

FIG. 1 is an explanatory diagram of a network configuration provided with wide area load distribution apparatuses in accordance with the present invention. In this embodiment four networks 10-1, 10-2, 10-3 and 10-4 are interconnected and these networks 10-1 to 10-4 can correspond to an internet or intranets for example. The wide area load distribution apparatuses of the present invention designated at 12-1, 12-2 and 12-3 are provided for the networks 10-1 to 10-3, respectively, and are interposed between the associated networks 10-1 to 10-3 and the network 10-4. Connected to the networks 10-1 to 10-3 are respectively servers 14-11 to 14-1n, 14-21 to 14-2n and 14-31 to 14-3n and are further a plurality of clients represented by clients 16-1, 16-2 and 16-3, respectively. To the network 10-4 is also connected an appropriate number of servers and clients not shown.

FIG. 2 shows the detail of an apparatus configuration by way of example of the wide area load distribution apparatus 12-1 provided for the network 10-1 of FIG. 1. The wide area load distribution apparatus 12-1 provided for the network 10-1 comprises a service allocation unit 20, a transfer transmission unit 24, a transfer reception unit 26, a load information reception unit 28 and a load information transmission unit 30. When the wide area load distribution apparatus 12-1 receives for example a client packet which is a service demand from the client 16 of the network 10-4, the service allocation unit 20 refers to load information at that time and selects any one of the servers of its own network 10-1 and the servers of the other network 10-2 to allocate services thereamong. When one server of its own network 10-1 is selected, the service allocation unit 20 processes a lighting of the service connection demand packet between the demander client 16 and the allocated server 14-11 for example as well as a relay of a response packet from the server 14-11 to the client 16. On the contrary, when the service allocation unit 20 selects one server of the other network 12-2 for server allocation, it creates a transfer packet containing the client packet from the client 16 in the form of transfer data and the transfer transmission unit 24 transfers the transfer packet via the network 10-4 to the wide area load distribution apparatus 12-2 of the other network 10-2. When the wide area load distribution apparatus 12-2 receives the transfer packet from the wide area load distribution apparatus 12-1, the former fetches the client packet from the transfer packet and selects the server 14-21 for example from among its own network 12-2 for allocation on the basis of the load information at that time and transfers the client packet data to the server 14-21. Upon the completion of such a packet transfer to the server 14-21, a response packet containing response data is sent from the server 14-21 via the network 10-2 to the transferee wide area load distribution apparatus 12-2 already recognizes the demander client 16 from the information of the processed transfer packet, it relays the response packet from the server 14-21 via the network 10-4 directly to the client 16.

In this manner the wide area load distribution apparatus 12-1 of the present invention allocates the server of the other network 10-2 in response to a service demand from the client 16 and transfers the service demand from the client to the allocated server and thereafter directly relays a response service thereto. In respect to routes for service allocation and relay executed by the wide area load distribution apparatus 12-1, there is a single allocation route along which service allocation is performed from the client to the server of the other network, although there are following two relay routes from the transferred server to the client.

I) A relay route in which a direct relay to the client 16 is performed by way of the transferee wide area load distribution apparatus 12-2; and II) A relay route in which a relay from the server to the client 16 is performed by way of the transferor wide area load distribution apparatus 12-1.

The processing actions of the wide area load distribution apparatuses achieved through these different relay routes will be described in greater detail in later description.

FIG. 3 is a function block diagram of the service allocation unit 20 provided in the wide area load distribution apparatus 12-1 of FIG. 2, the service allocation unit 20 being shown together with the transmission and reception units for the network. The service allocation unit 20 includes a server allocation unit 32, a server transfer unit 34, a client relay unit 36, a connection management unit 38, a connection information table 40, a load information management unit 42 and a load information table 44. When the server allocation unit 32 receives a client package in the form of a service demand from the client associated with the network 10-1 or the network 10-4, it selects a server of its own network or a server of the other network for allocation to provide the service, on the basis of the load information of the servers provided in its own network or the other network, which information is obtained by the load information management unit 42 referring to the load information table 44. When the server allocation unit 32 allocates a service provision to the server of the other network, the transfer transmission unit 24 creates a transfer packet containing a client packet being received at that time in the form of transfer data and transfers the transfer packet via a predetermined transfer protocol to the wide area load distribution apparatus of another network.

Figure 4B:
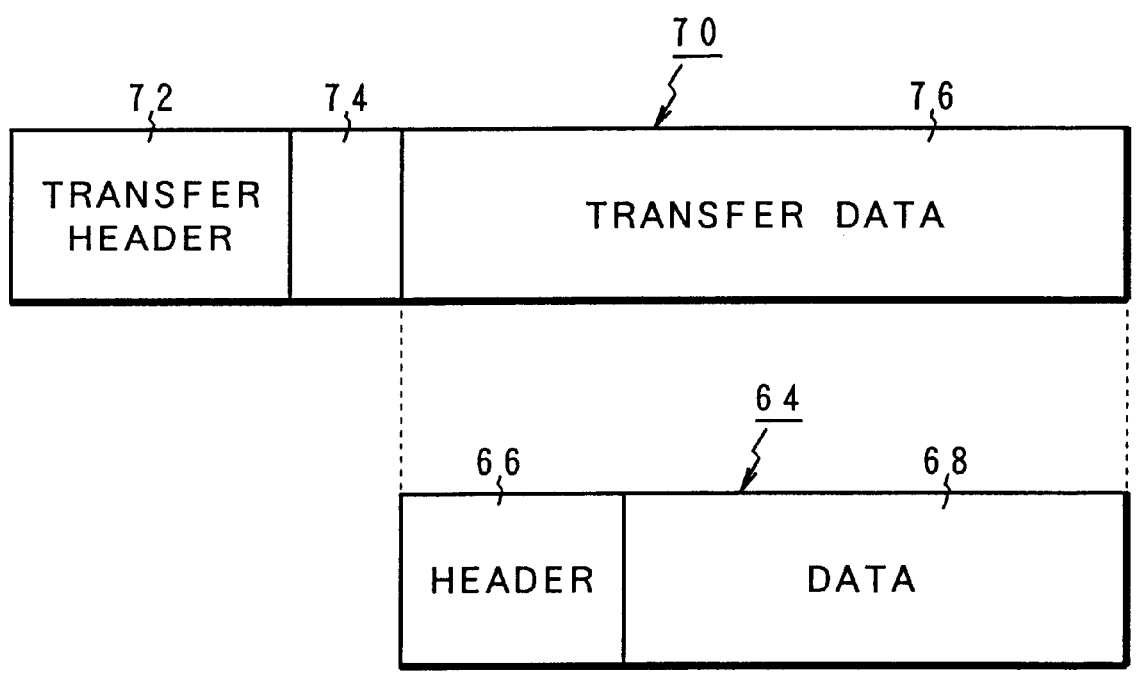

FIGS. 4A and 4B are explanatory diagrams of a protocol packet from a client received by the server allocation unit 32 and a transfer packet created by the transfer transmission unit 24 for transfer. A client packet 64 received from the client of FIG. 4A consists of a header 66 and data 68. The header 66 stores sender information and destination information. The sender information and destination information consist of their respective addresses and allocated port numbers. A transfer packet 70 of FIG. 4B consists of a transfer header 72, transfer data 76 as well as additional information 74. The transfer data 76 store intactly a reception packet 64 received from the client of FIG. 4A. The transfer packet 70 containing the transfer data 76 in the form of the reception packet 64 can be for example a user datagram protocol packet (UDP packet) generated and transmitted. By allowing the reception packet 64 from the client to be contained in the transfer data 76 of the transfer packet 70 of the appropriate transfer protocol for the transmission to the wide area load distribution apparatus of another network in this manner, a higher flexibility and extensibility can be achieved with a higher transfer efficiency including:

I) capability of conforming to individual transfer protocols;

II) capability of adding information such as transfer number of times which can be utilized by the transferee, through the utilization of the additional information 74; and III) omission of labor of connection establishment through the continual establishment of the connection for the transfer; as compared with the case of transfer through the address conversion of the header 66 of the reception packet 64 of FIG. 4A.

Referring again to FIG. 3, when the transfer reception unit 26 receives the transfer packet 70 as in FIG. 4B from the wide area load distribution apparatus of the other network, it fetches the client packet 64 from the transfer data 76 of the transfer packet 70 for the supply to the server transfer unit 34. Through the retrieval of the connection information table 40 by the connection management unit 38, the server transfer unit 34 acquires a server which is the destination in response to the service demand of the client packet from the transfer reception unit 26. The server transfer unit 34 then transfers the client packet data to the thus acquired allocation server. In this case, the destination and sender of the client packet are address converted for the transfer to the server side. The client relay unit 36 provides different functions between the route where direct relay to the client is performed by way of the transferee wide area load distribution apparatus and the route where a relay to the client is performed via the transferor wide area load distribution apparatus without passing through the transferee wide area load distribution apparatus. First, in respect to the relay route by way of the transferee wide area load distribution apparatus, when the client relay unit 36 receives a server packet form the server associated with the network 10-1, it performs the address conversion of the destination and the sender and relays the server packet from the network 10-2 directly to the client. On the contrary, in the relay route by way of the transferor wide area load distribution apparatus, when the client relay unit 36 receives a server packet from the network 10-4 side, it address converts the destination and the sender of this server packet and relays it to the client by way of the network 10-1. Upon the address conversion of the server packet in the client relay unit 36, the connection management unit 38 retrieves the connection information table 40 to acquire the correlation between the client transferor and the server for execution of the address conversion.

Figure 5:
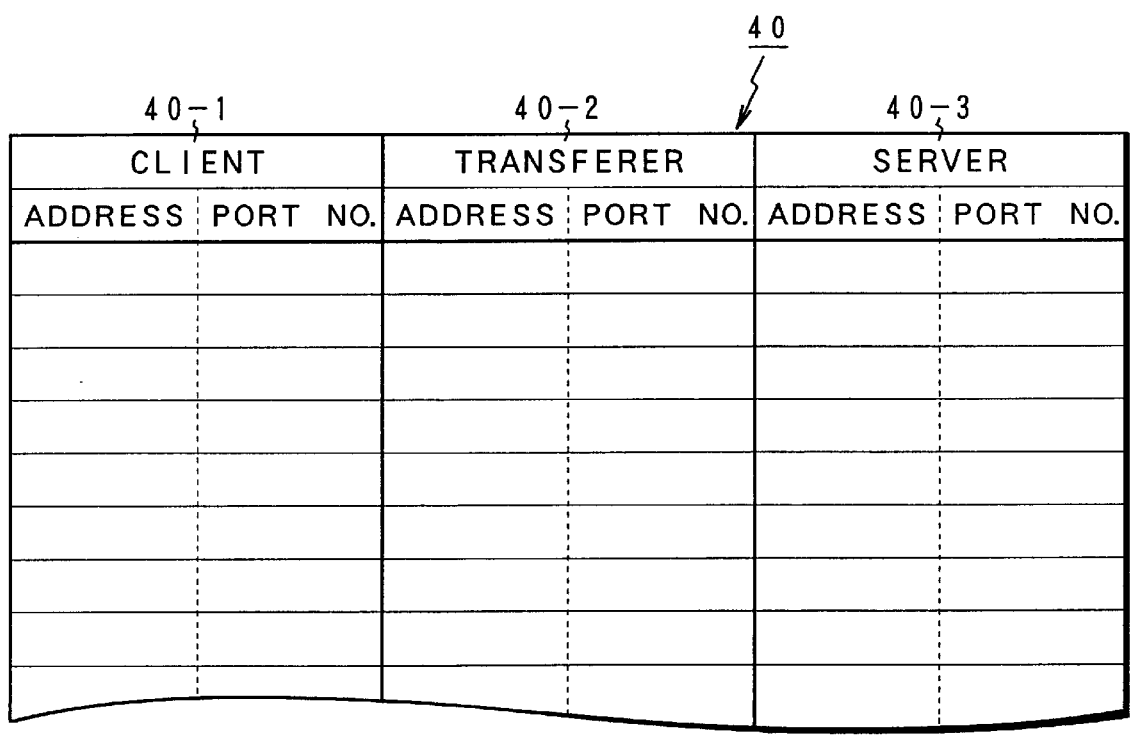
FIG. 5 is an explanatory diagram of service allocation processing for servers of its own network, effected by the wide area load distribution apparatus of the present invention.

FIG. 5 is an explanatory diagram of the connection information table 40 of FIG. 3. The connection information table 40 is provided with a client region 40-1, a transferor region 40-2 and a server region 40-3 which store their respective addresses and port numbers. This connection information table 40 is basically retrieved by use of the addresses and port numbers of the client and transferor obtained from the protocol packet 64 contained in the transfer data 76 of the transfer packet 70 of FIG. 4B received by the transfer reception unit 26 of FIG. 3 from the other wide area load distribution apparatus, to thereby acquire the address and port number of the corresponding server. If it is a transfer packet of a first service connection demand at that time, no address and port number of the allocated server will be obtained even though the connection information table 40 is retrieved by use of the addresses and port numbers of the client and the transferor obtained from the transfer packet. In this case, the load information management unit 42 of FIG. 3 receives a request for server allocation. The load information management unit 42 selects an allocated server on the basis of the load information of the load information table 44 about the server existing in its own network 10-1 and newly registers the address and the port number of the thus selected server together with the addresses and the port numbers of the client and the transferor. Then after the new registration, the connection information table 40 is again retrieved by use of the addresses and the port numbers of the client and the transferor obtained from the transfer packet, thereby making it possible to acquire the address and the port number of the allocated server.

(Wide Area Load Distribution Processing—Part 1)

Part 1 of the wide area load distribution processing is processing in which upon the allocation of service provision to the servers of the other network 10-2 in response to a service demand from the client 16 on the wide area load distribution apparatus 12-1 of FIG. 2, a response packet from the server is relayed directly to the client 16 by way of the wide area load distribution apparatus 12-2 of the transferee without passing through the wide area load distribution apparatus 12-1 of the transferor.

Figure 6:
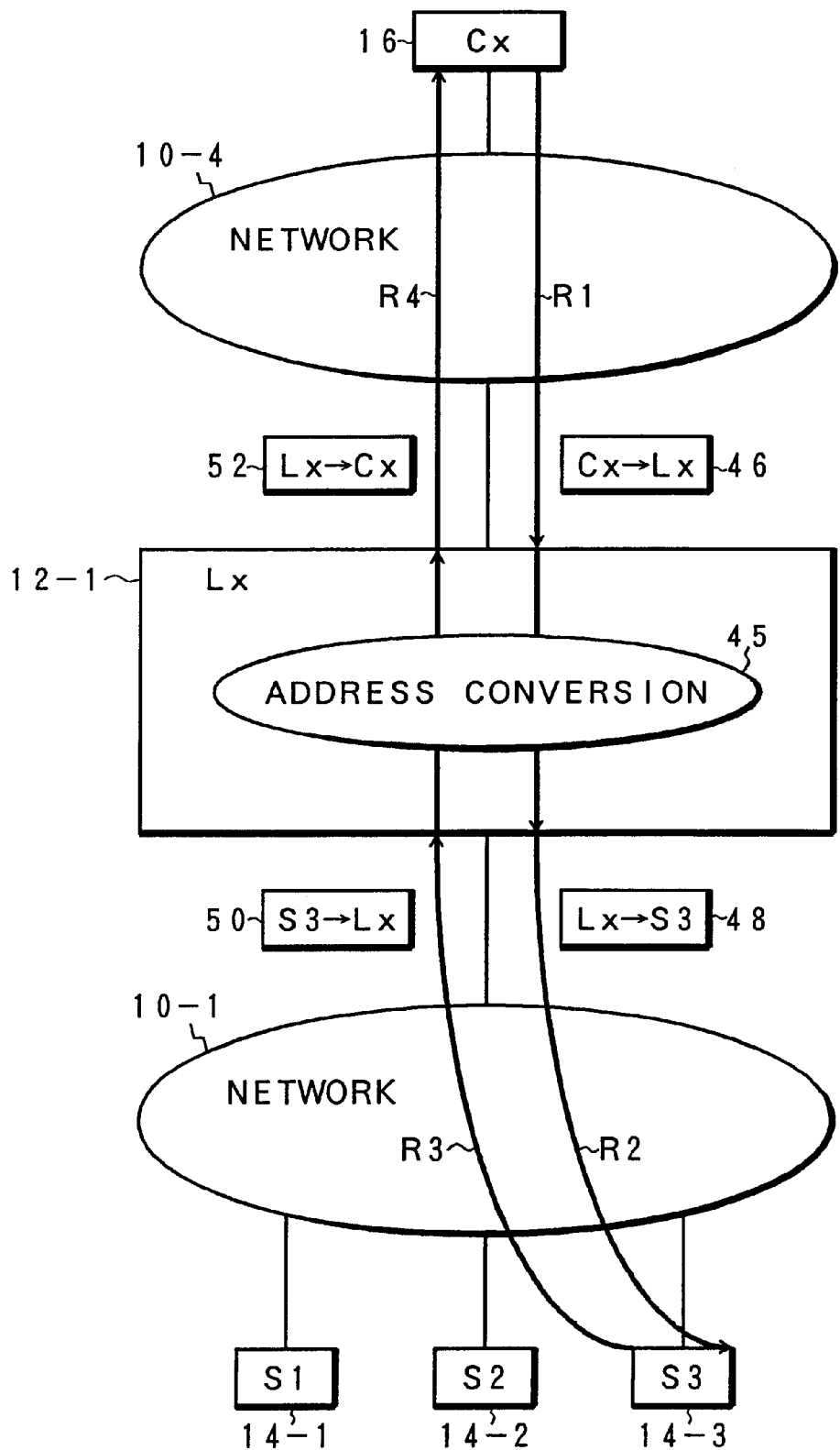
FIG. 6 is an explanatory diagram of service allocation processing for the servers of the other network, effected by the wide area load distribution apparatus of the present invention.

Reference is made to FIG. 6 to explain the processing performed when the service is allocated to the server of its own network 10-1 in response to a service demand from the client 16 in the service allocation unit 20 of FIG. 2.

In FIG. 6, assume that the server 16 of the network 10-4 sends a client packet 46 to the wide area load distribution apparatus 12-1 for the demand of service. Assume that in response to this demand of service by the client packet 46, the wide area load distribution apparatus 12-1 allocates the service provision to the server 14-3 for example belonging to its own network 10-1 on the basis of the load information at that time. For this reason, the client packet 46 from the client 16 is subjected to an address conversion 45 by the wide area load distribution apparatus 12-1 and is transferred as a client packet 48 to the server 14-3. More specifically, the client packet from the client 16 is sent through a demand route R1 to the wide area load distribution apparatus 12-1 and is transferred via the address conversion 45 and through an allocation route R2 to the client 14-3. Upon the reception of the service demand through the demand route R1 and the allocation route R2, the server 14-3 sends a server packet 50 for response by way of a relay route R3 to the wide area load distribution apparatus 12-1 and further as a relay packet 52 via the address conversion 45 through a relay route R4 to the client 16. Herein, let Cx, Lx and S3 be the address of the client 16, the address of the wide area load distribution apparatus 12-1, and the address of the allocated server 14-3, respectively. Note that although each address Cx, Lx, and S3 contains the port number, it is referred to as the address for simpler description. The client packet 46 from the client 16 has the client address Cx for the sender and has the wide area load distribution apparatus address Lx for the destination. The addresses of the sender and the destination of the client packet 46 are converted by the address conversion 45 into the wide area load distribution apparatus Lx and the server address S3 to be allocated, respectively, shown by the transfer packet 48. On the other hand, the server packet 50 for response from the server 14-3 has the server address S3 for the sender and has the wide area load distribution apparatus address Lx for the destination, which are converted by the address conversion 45 into the wide area load distribution apparatus 12-1 and the client address Cx, respectively, as shown by the relay packet 52. As in FIG. 6, if the address conversion rule in the allocation route and the relay route upon the allocation of the client of its own network in response to the service demand is defined as an address conversion rule 1, the following summarization is given.

[Address Conversion Rule 1 (Allocation to Its Own Network Server)]

I) Client Packet Reception conversion of destination from self address Lx to server address S conversion of sender from client address C to self address Lx (pre-conversion sender/post-conversion sender→pre-conversion destination/post conversion destination)= (C/Lx→Lx/S)

II) Sever Packet Reception conversion of destination from self address Lx to client address C conversion of sender from client address C to self address Lx (pre-conversion sender/post-conversion sender→pre-conversion destination/post-conversion destination)= (S/Lx→Lx/C)

Figure 7:
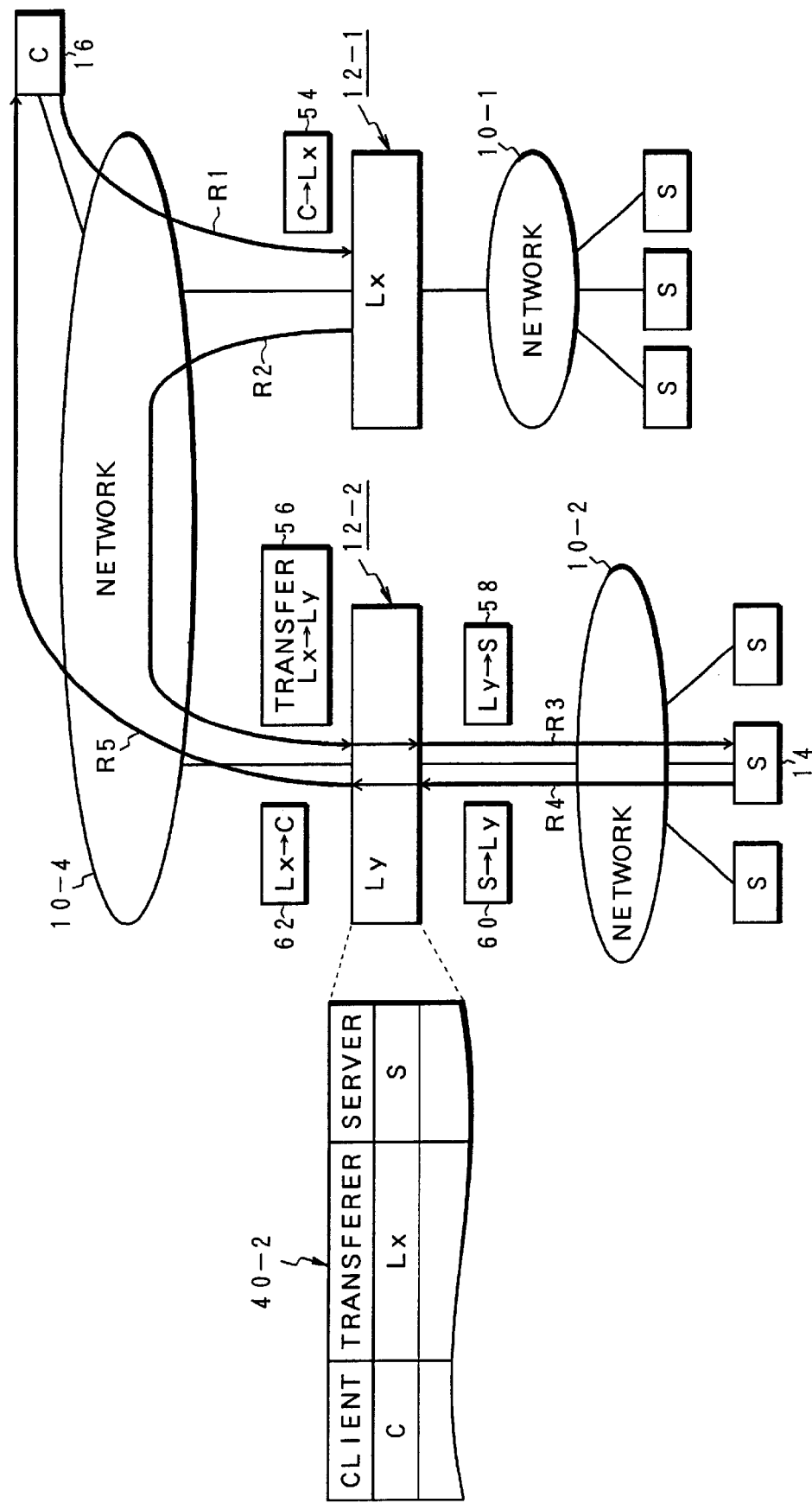
FIG. 7 is an explanatory diagram of a client packet received from a client in FIG. 6 and a transfer packet to be transferred to the other wide area load distribution apparatus.

FIG. 7 shows processing actions performed in case where when the client 16 sends a service demand client package to the wide area load distribution apparatus 12-1 of FIG. 2, its service allocation unit 20 allocates the service to the server of the another network 10-2. In FIG. 7, a client packet 54 from the client 16 is sent through the service demand route R1 to the wide area load distribution apparatus 12-1. Assume that in response to the client packet 54, the wide area load distribution apparatus 12-1 refers to the load information at that time and consequently allocation is made to the server of the other network 10-2 due to the greater loads of the servers 14-11 to 14-in of its own network 12-1. With the allocation to the server of the other network 10-2, an address Ly can be acquired of the wide area load distribution apparatus 12-2 provided in the other network 10-2, so that creation is made of a transfer packet 56 similar to the transfer packet 70 of FIG. 4B containing the client packet 54 in the form of the transfer data, the transfer packet 56 being transferred via the network 10-4 and through the transfer route R2 to the wide area load distribution apparatus 12-2. Upon the reception of this transfer packet 56, the wide area load distribution apparatus 12-2 fetches a client packet 54 from the transfer data of the transfer packet 56 and converts its address to transfer it as a client packet 58 via the network 10-2 to the server 14 to be allocated. A server packet 60 as a service response is sent from the server 14 via the network 10-2 to the transferee wide area load distribution apparatus 12-2, which in turn address converts the server packet 60 and transfers a relay packet 62 through the relay route R5 and directly via the network 10-4 to the client 16. In this case, the address conversion is carried out in the transferee wide area load distribution apparatus 12-2 which has received the transfer packet 56, in accordance with the following address conversion rule 2.

[Address Conversion Rule 2 (Allocation to Other Network Server)]

I) Transfer Packet Reception extraction of client packet from transfer packet conversion of destination from transferor address Lx to server address S conversion of sender from client address C to self address (transferee address) Ly (pre-conversion sender/post-conversion sender→pre-conversion destination/post-conversion destination=C/Ly→Lx/S)

II) Sever Packet Reception conversion of destination from self address (transferee address) Ly to client address C conversion of sender from server address C to transferor address Lx (pre-conversion sender/post-conversion sender→pre-conversion destination/post-conversion destination)= (S/Lx→Ly/C)

Herein, the address conversion upon the sending of the client packet 58 to the server 14 after the reception of the transfer packet 56 follows an address transition (C-Lx-Ly-S) of the client 16, the transferor 12-1, the transferor 12-2 and the server 14, which results in an allocation route for the service allocation. On the contrary, in the relay route from the server 14 to the client 16, the address of the transferor 12-1 is used as the post-conversion sender address Lx without using the pre-conversion destination Ly intactly as the post-conversion sender at the transferee 12-2, with no relay route address (S-Ly-C) of the server 14, the transferee 12-2 and the client 16.

For this reason, the client 16 issuing a service demand receives directly a relay packet 62 with the transferor address Lx equal to the sender address through the relay route R5 from the wide area load distribution apparatus 12-2 of the other network so that the destination address Lx of the client packet 54 coincides with the sender address Lx of the relay packet 62, thereby achieving the consistency. Furthermore, the server packet 60 from the server 14 is relayed from the transferee wide area load distribution apparatus 12-2 directly to the client 16 without passing through the transferor wide area load distribution apparatus 12-1 so that there can be prevented an overhead due to the relay route which would occur in case of passing through the transferor.

Figure 8:
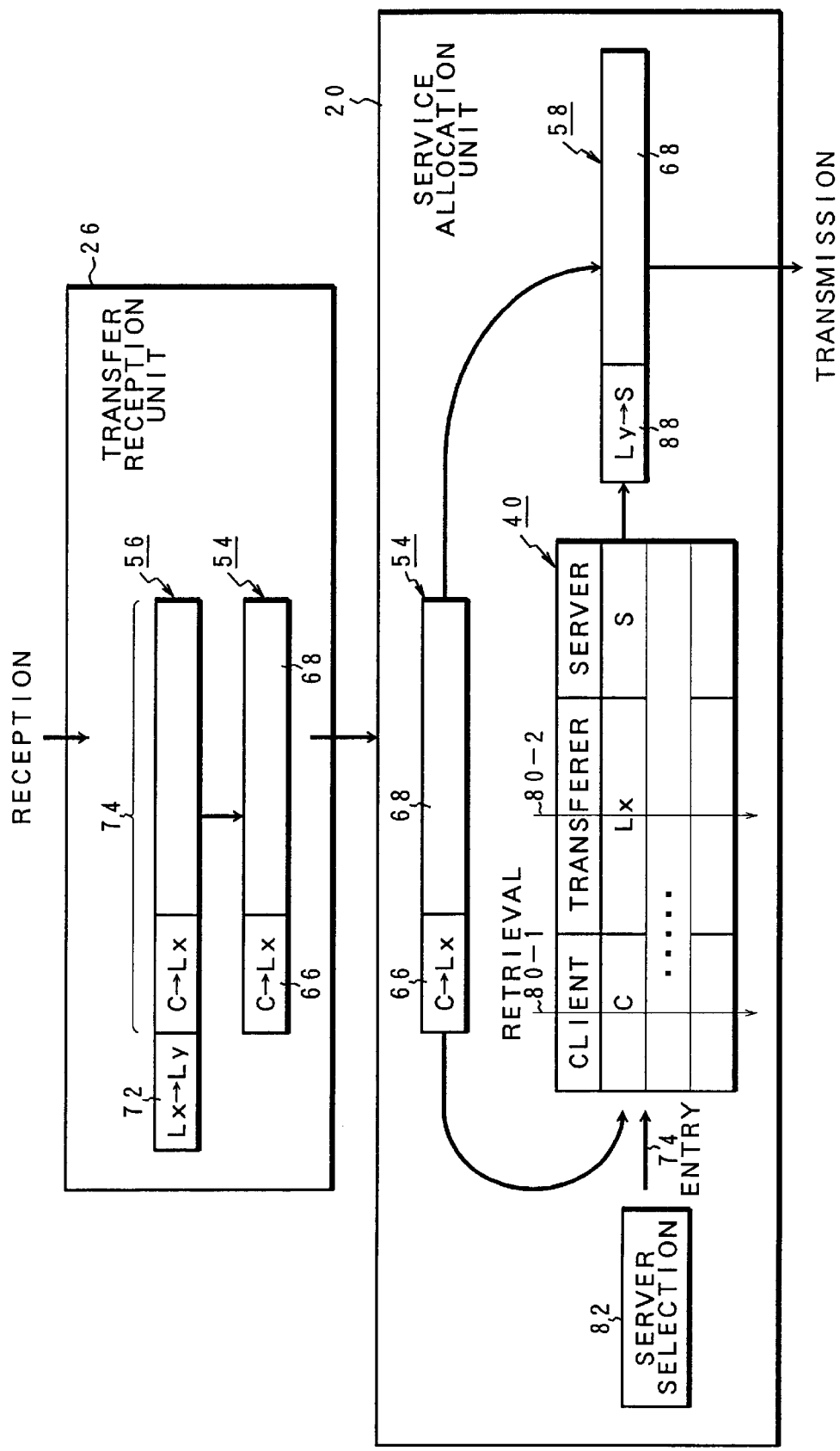
FIG. 8 is an explanatory diagram of server transfer processing effected when the wide area load distribution apparatus of the present invention has received the transfer packet in FIG. 6.

FIG. 8 shows the detail of the service allocation processing performed when the transferee wide area load distribution apparatus 12-2 of FIG. 7 has received the transfer packet. When the transfer reception unit 26 of the transferee wide area load distribution apparatus 12-2 receives a transfer packet 70, it extracts a client packet 64 from the transfer data 74 following the header 72 and feeds it to the service allocation unit 20. The service allocation unit 20 fetches a client address C and a transferor address Lx from the header 66 of the client packet 64 fed from the transfer reception unit 26 and executes the retrievals 80-1 and 80-2 of the connection information table 40. Upon the reception of the first connection demand transfer packet, the connection information table 40 has no registration of correlation between the client transferor and the server. In such a case, a server selection 82 is made on the basis of the load information to perform the registration 84 of the client C, the transferor Lx and the server S to be allocated. After this registration 74, the retrievals 80-1 and 80-2 are again executed using the client address C and the transferor address Lx which are obtained from the client packet 64, to thereby acquire a server address S to be allocated. Then, the header address of the client packet 64 is address converted as in the header 88 of the client packet 86 and is sent to the server to be allocated of its own network.

Figure 9:
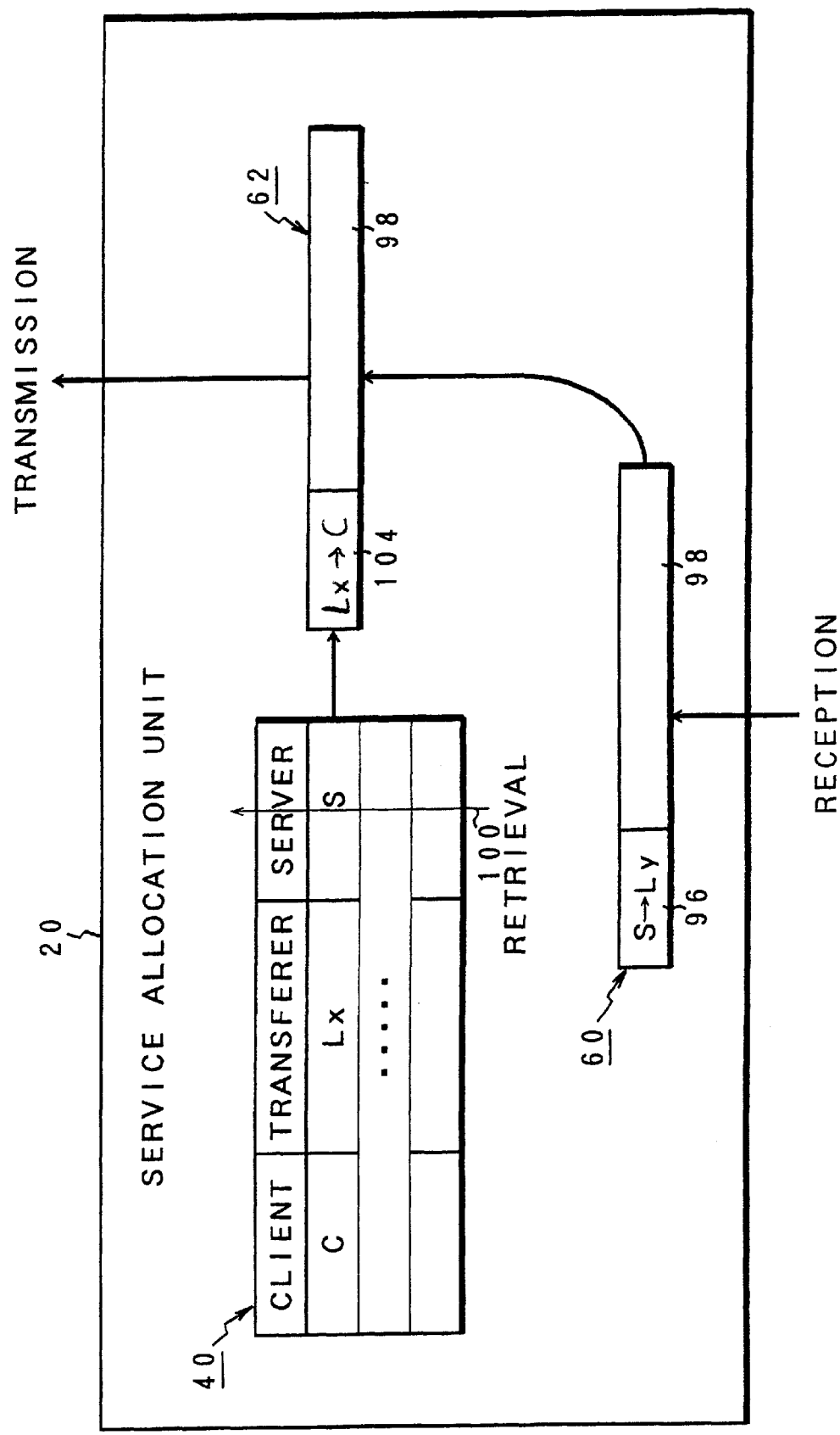
FIG. 9 is an explanatory diagram of client transfer processing effected when the wide area load distribution apparatus of the present invention has received the server packet from the server in response to a transferred service in FIG. 6.
Figure 10A:
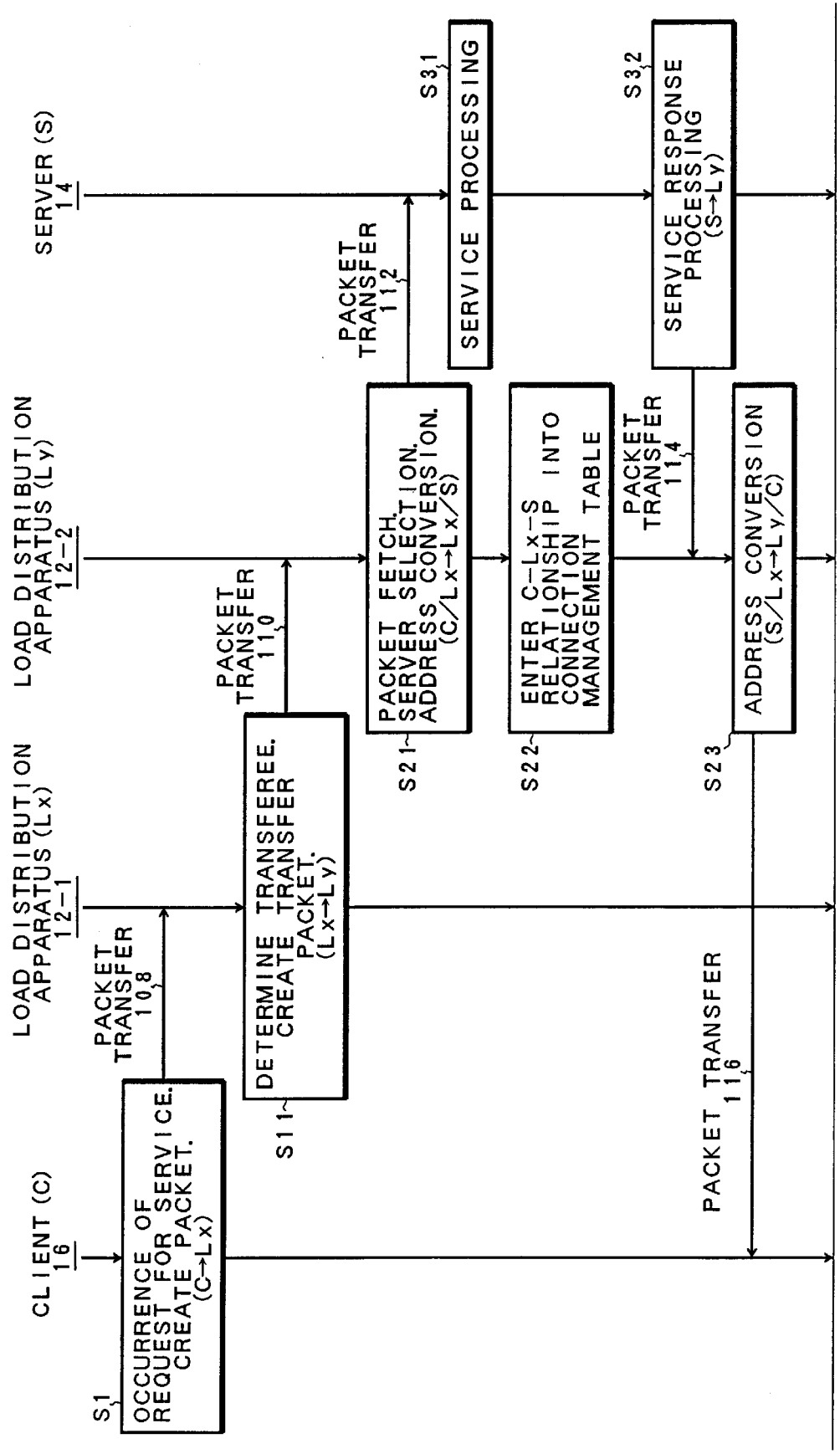
FIGS. 10A and 10B are time charts of processing actions effected when the wide area load distribution apparatus of FIG. 6 has allocated the service to the server of the other network.
Figure 10B:
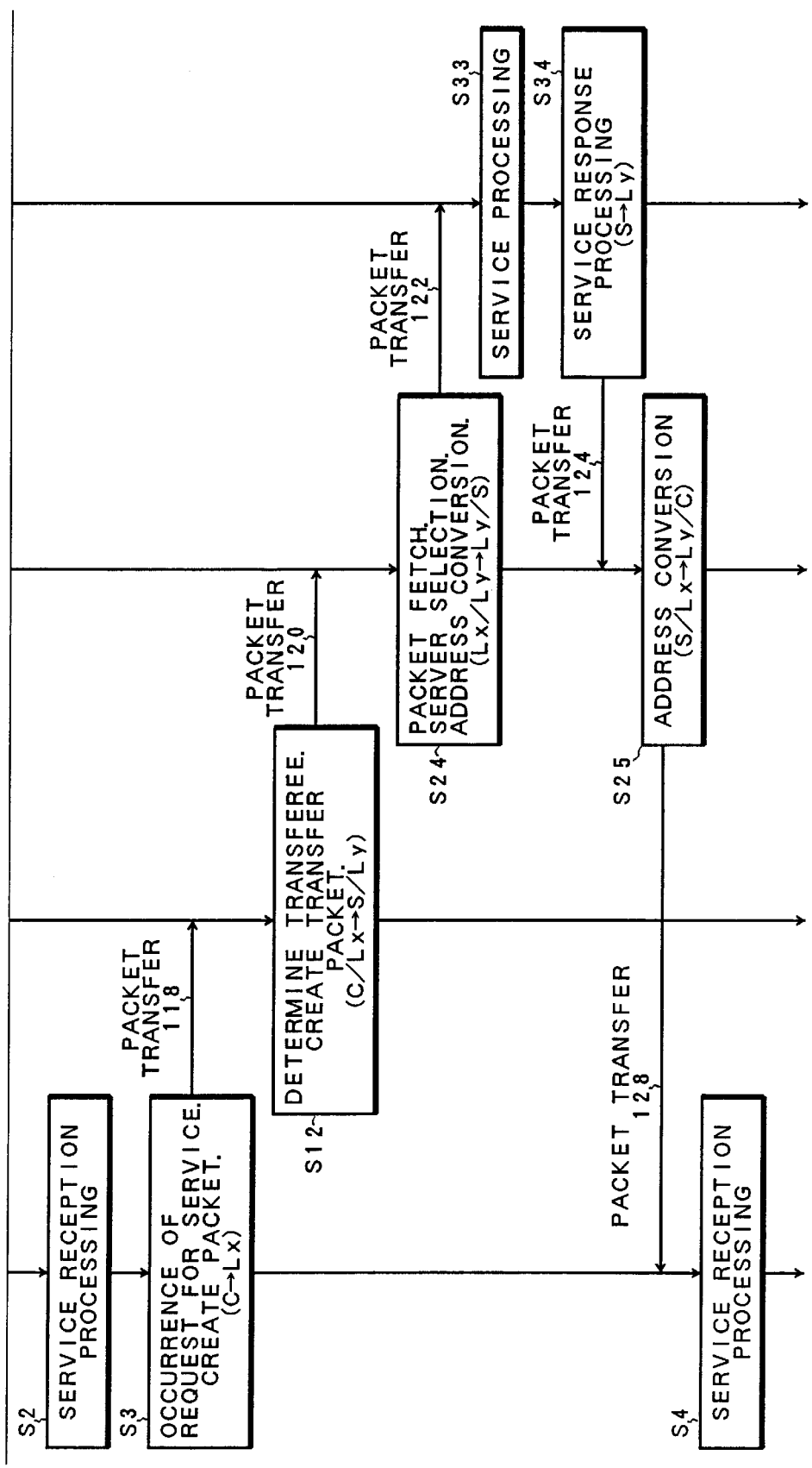

FIG. 9 shows the processing actions of the service allocation unit 20 in the transferee wide area load distribution apparatus 12-2 in case where a server packet for service response has been received from the server 14 to be service allocated in FIG. 7. When the server packet 60 is received from the server 14 of its own network, a retrieval 100 of the connection information table 40 is carried out using the server address S contained in its header 96. At that time, upon the allocation processing of the transfer packet of FIG. 8 there has already been registered the correlation between the client transferor and the server relating to this service, so that there are obtained the client address C and the transferor address Lx which correspond to the server address S. Thus the header 96 of the server packet 60 is subjected to address conversion as in the header 104 and is sent via the network to the client. FIGS. 10A and 10B are time charts of service allocation processing of FIG. 7. First, when in step S1 the client 16 issues a service demand, a client packet is generated and a packet transfer 108 is carried out with the client address C as the sender and with the apparatus address Lx of the wide area load distribution apparatus 12-1 as the destination. Upon the reception of the client packet through the packet transfer 108, the wide area load distribution apparatus 12-1 in step S11 determines the transferee wide area load distribution apparatus 12-2 to which the demanded service is to be allocated, and generates a transfer packet for a packet transfer 110. Upon the reception of the packet transfer 110, the transferee wide area load distribution apparatus 12-2 fetches a client packet from the transfer packet received in step S21, selects a server on the basis of load information and performs the address conversion of the fetched client packet for the packet transfer 112 to the server 14. Then in step S22 the relationship between the client transferor and the server is entered into the connection management table. After the reception of the packet transfer 112 from the wide area load distribution apparatus 12-2, the server 14 to be provided with the service executes the service processing based on the packet data in step S31, and in step S32 sends a server packet as service response processing to the wide area load distribution apparatus 12-2 by the packet transfer 114. This server packet from the server 14 is address converted in step S23 and is subjected as a relay packet to a direct packet transfer 116 to the client 16. Upon the reception of this relay packet, the client 16 performs the reception processing of the service packet in step S2. Then the client 16 issues a second same service demand in step S3. In case of the second service demand client packet as well, the wide area load distribution apparatus 12-1 generates a transfer packet in step S12 and performs a packet transfer 120. The transferee wide area load distribution apparatus 12-2 performs the packet fetch, the server selection and the address conversion in step S24 for the packet transfer 122 to the server 14. Since at that time the correlation between the client transferor and the server has already been entered into the connection management table 40 through the connection processing for the first service demand in steps S21 and S22, the server S to be allocated is immediately determined by the retrieval of the connection management table 40 so that the service can continue for the same server 14 without performing the server allocation based on the load information. In response to the second service demand, the server 14 performs the service processing in step S33 and sends a server packet as the service response processing in step S34, whereas the transferee wide area load distribution apparatus 12-2 performs the address conversion in step S25 for the direct packet transfer 128 of the relay packet to the client 16. In step S4 the service reception processing is carried out. Such a service demand is repeated in the same manner until the client 16 issues an end packet.

Figure 11B:
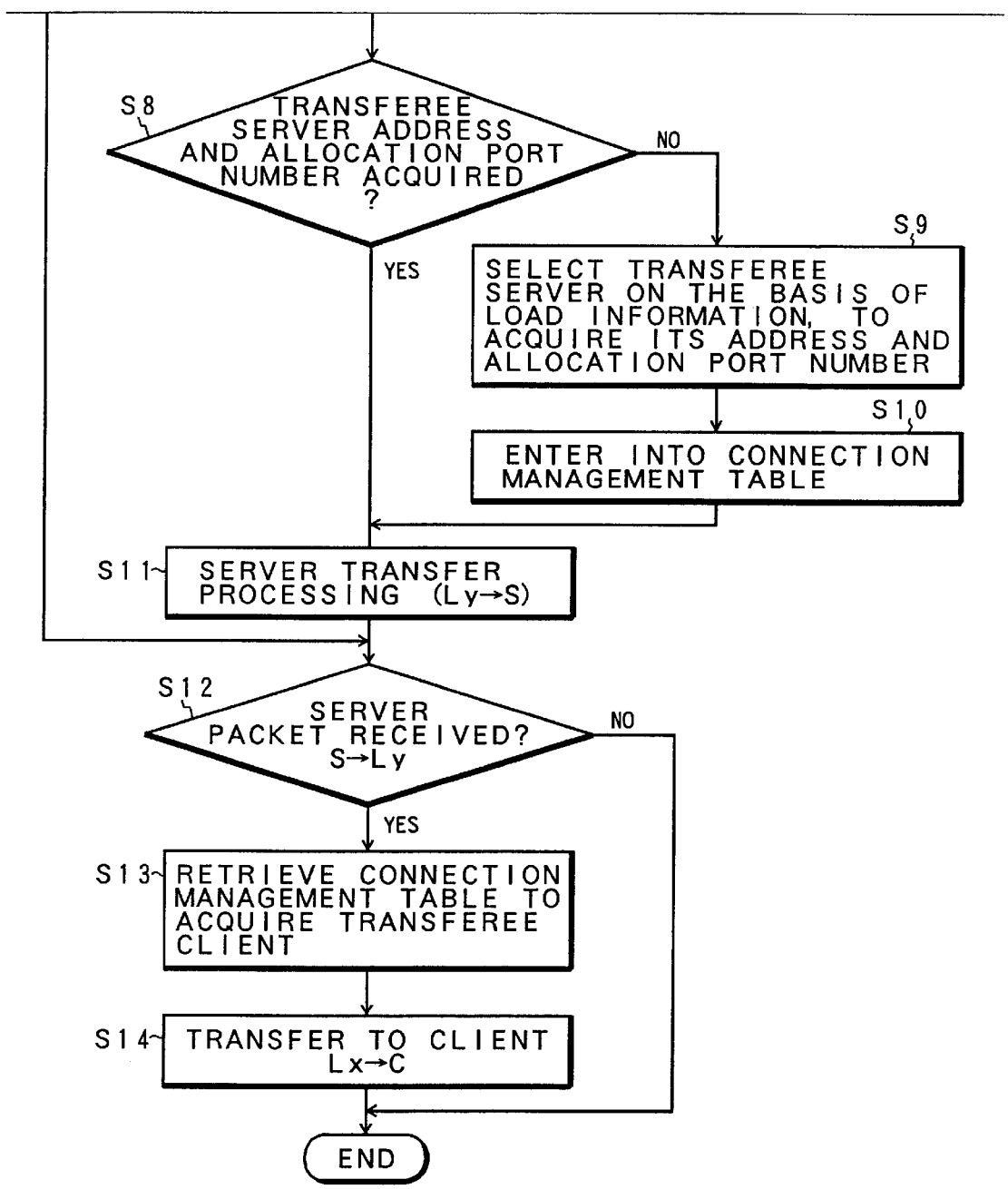

FIGS. 11A and 11B are flowcharts of the allocation processing executed by the wide area load distribution apparatus of the present invention in accordance with the address conversion rules 1 and 2 of FIGS. 6 and 7. When a client packet is received in step S1, determination is made of a destination server to be allocated on the basis of the load information in step S2. If the thus determined destination server belongs to the other wide area load distribution apparatus, then in step S3 judgment is made of a transfer to the other wide area load distribution apparatus, and a transfer packet is created in step S4 to perform transfer processing for the transfer to the other wide area load distribution apparatus. On the contrary, if the server of its own network has been determined as the destination in step S3, a direct transfer processing to the server via the network is carried out in step S3. Then if a transfer packet from the other wide area load distribution apparatus has been received in step S6, the connection information table 40 is retrieved in step S7 on the basis of the client address and the transferor address of the client packet extracted from the transfer packet, and in step S8 a check is made to see if the address and the allocation port number of the transferee server have been acquired or not. Since the address and the allocation port number are not acquired from the first service connection demand, the procedure advances to step S9 in which selection is made of the transferee sever to be allocated on the basis of the load information at that time so that the address and the allocation port number of the thus selected transferee server are acquired. Then in step S11 the entry into the connection management table 40 is carried out and again in step S7 the table retrieval is performed. This allows the address and the allocation port number of the newly entered transferee sever to be acquired, so that in step S11 the server transfer processing is carried out. Then if a service response server packet has been received from the server after the transfer in step S12, the connection management table is retrieved in step S13 to acquire the addresses and the port numbers of the transferee, the transferor and the client, and the server packet address is converted for the transfer as a relay packet to the client.

Figure 12:
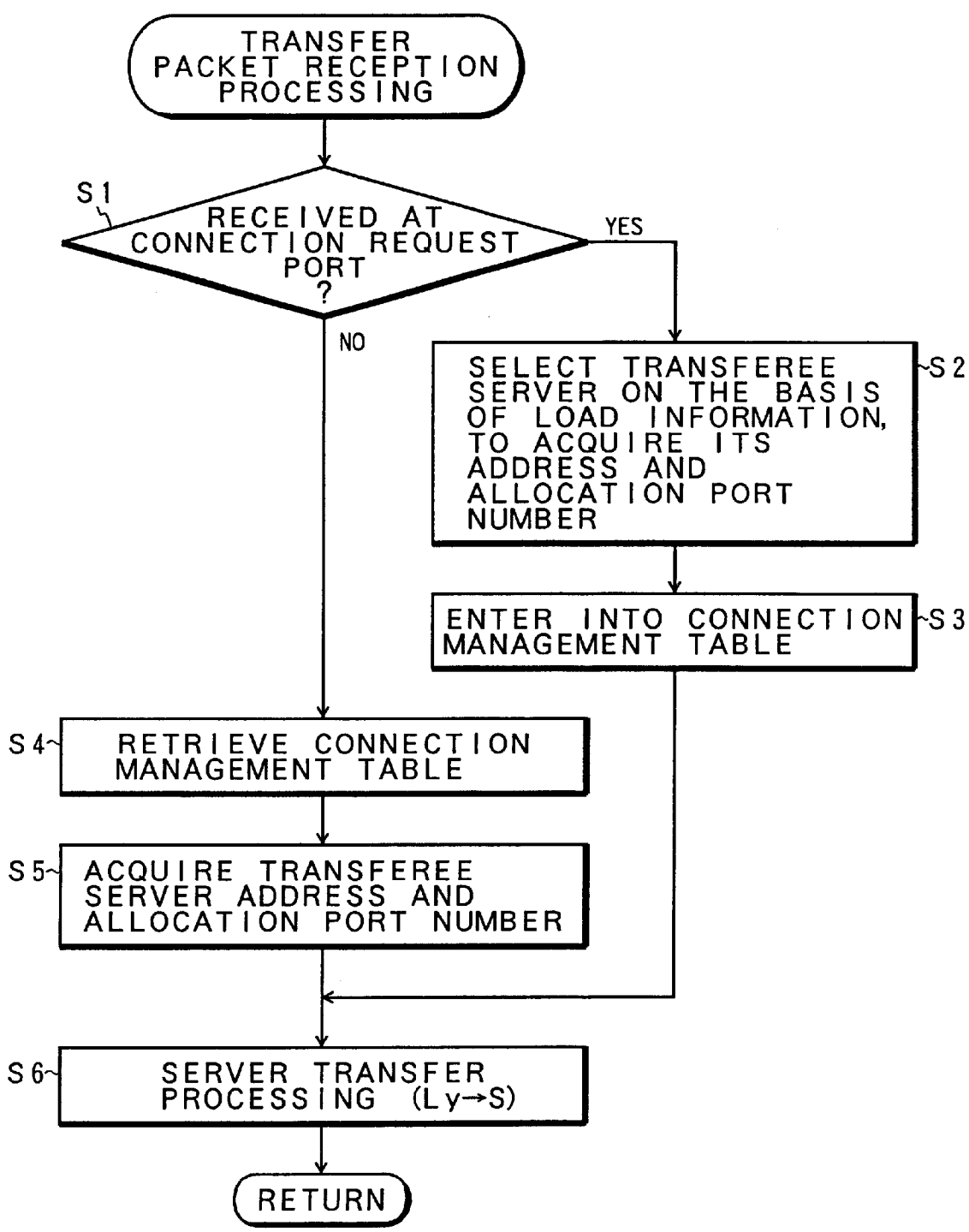
FIG. 12 is a flowchart of transfer packet reception processing effected by the wide area load distribution apparatus when the transfer packet is received separately by a connection demand port and a in-service port.

FIG. 12 shows another embodiment of the transfer packet reception processing of steps S6 to S11 of FIGS. 11A and 11B. This embodiment is characterized in that a transfer packet connection demand and in-service are distinguishably received in a connection demand port and an in-service port so that the retrieval processing of the connection management table can not be performed when the transfer packet has been received in the connection demand port. If in step S1 the transfer packet has been received in the connection demand port, the procedure advances to step S2, in which the address and the allocation port number of the transferee server are immediately acquired on the basis of the load information without retrieving the connection management table. In step S3 they are entered into the management table and in step S6 they are subjected to the server transfer processing. For this reason, there is no need for the retrieval processing of the connection management table which has been performed in step S7 of FIG. 11A upon the connection demand, which contributes to a reduction in the processing burden. On the contrary, if a reception in the in-service port has been judged in step S1, the retrieval of the connection management table is carried out in step S4, and the address and the allocation port number of the transferee server are acquired in step S5, and the server transfer processing is carried out in step S6.

Figure 13:
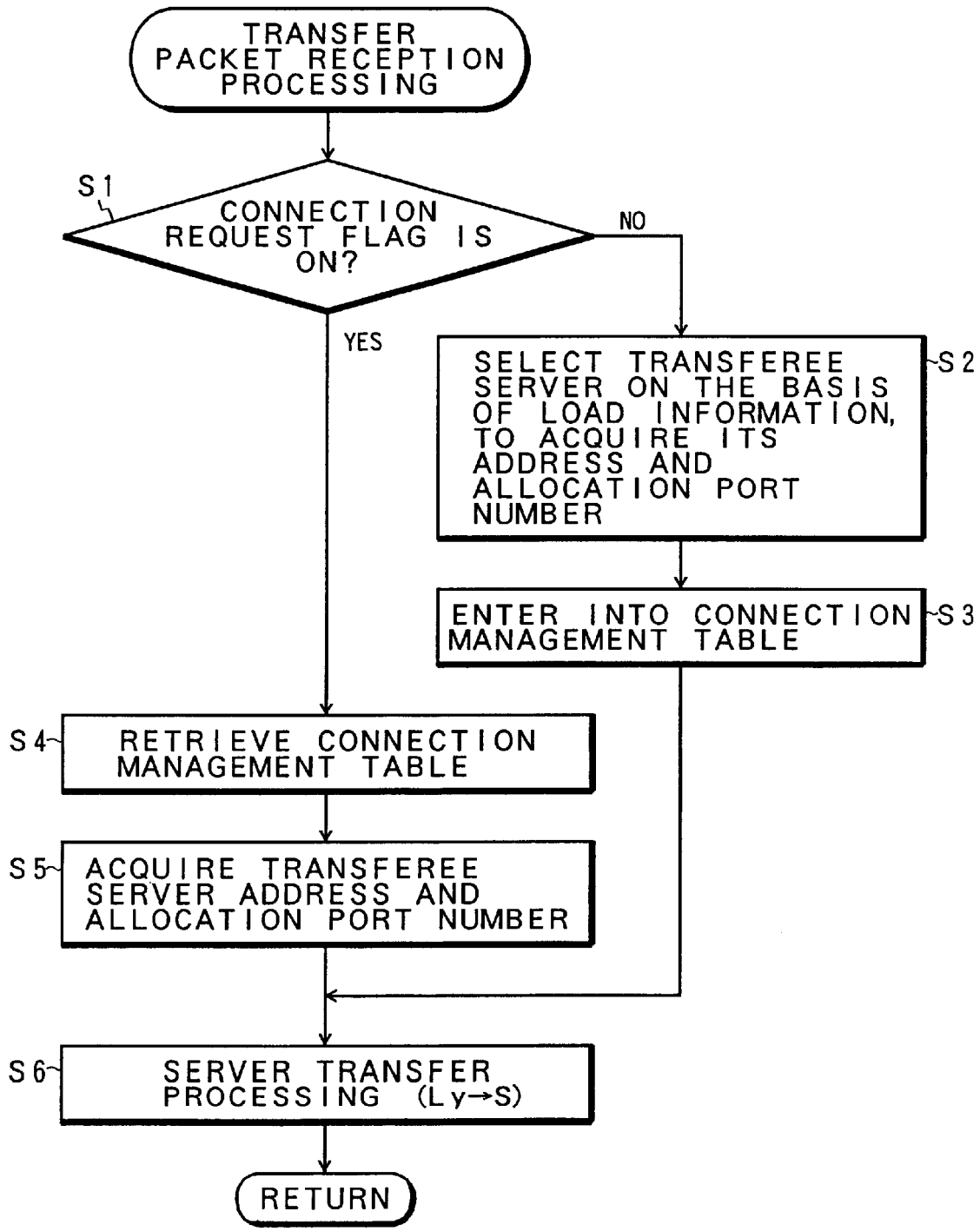
FIG. 13 is a flowchart of packet reception processing effected by the wide area load distribution apparatus of the present invention for recognizing flag information indicative of connection demand or in-service added to the transfer packet to thereby determine the presence or absence of retrieval of the connection management table.

FIG. 13 shows a further embodiment of the transfer packet reception processing of the same steps S6 to S11 of FIGS. 11A and 11B. In this embodiment, flag information 128 indicative of connection demand or in-service is provided as additional information following a transfer header 72 of a transfer packet 70 as in FIG. 14 so that the presence or absence of the retrieval of the connection management table can be judged through the discrimination of the connection demand or in-service using this flag information 128.

Figure 14:
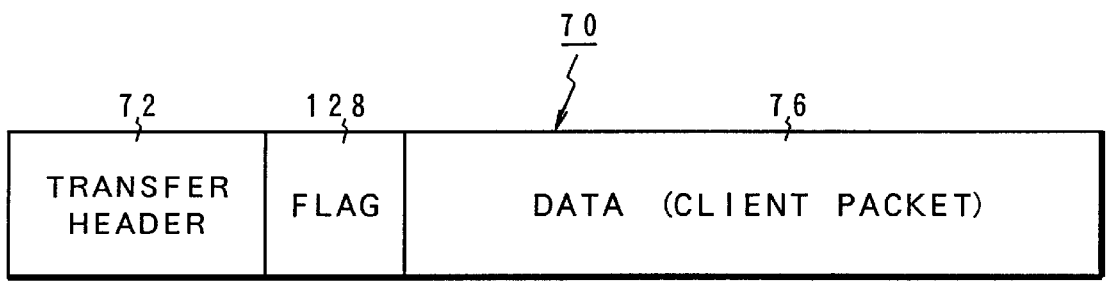
FIG. 14 is an explanatory diagram of the transfer packet with flag information for use in FIG. 13.

In FIG. 13, a check is first made in step S1 to see if the flag information 128 of FIG. 14 fetched from the transfer packet is in on-state indicative of the connection demand. If it is in on-state, the procedure goes to step S2, in which a transferee server is selected on the basis of the load information to acquire the address and the allocation number thereof. After the entry into the connection management table in step S3, the server transfer processing is carried out in step S6. On the contrary, if it is in service during which the connection demand flag becomes off in step S1, then the connection management table is retrieved in step S4, the address and the allocation port number of the transferee server are acquired in step S5, and the server transfer processing is carried out in step S6.

Figure 15:
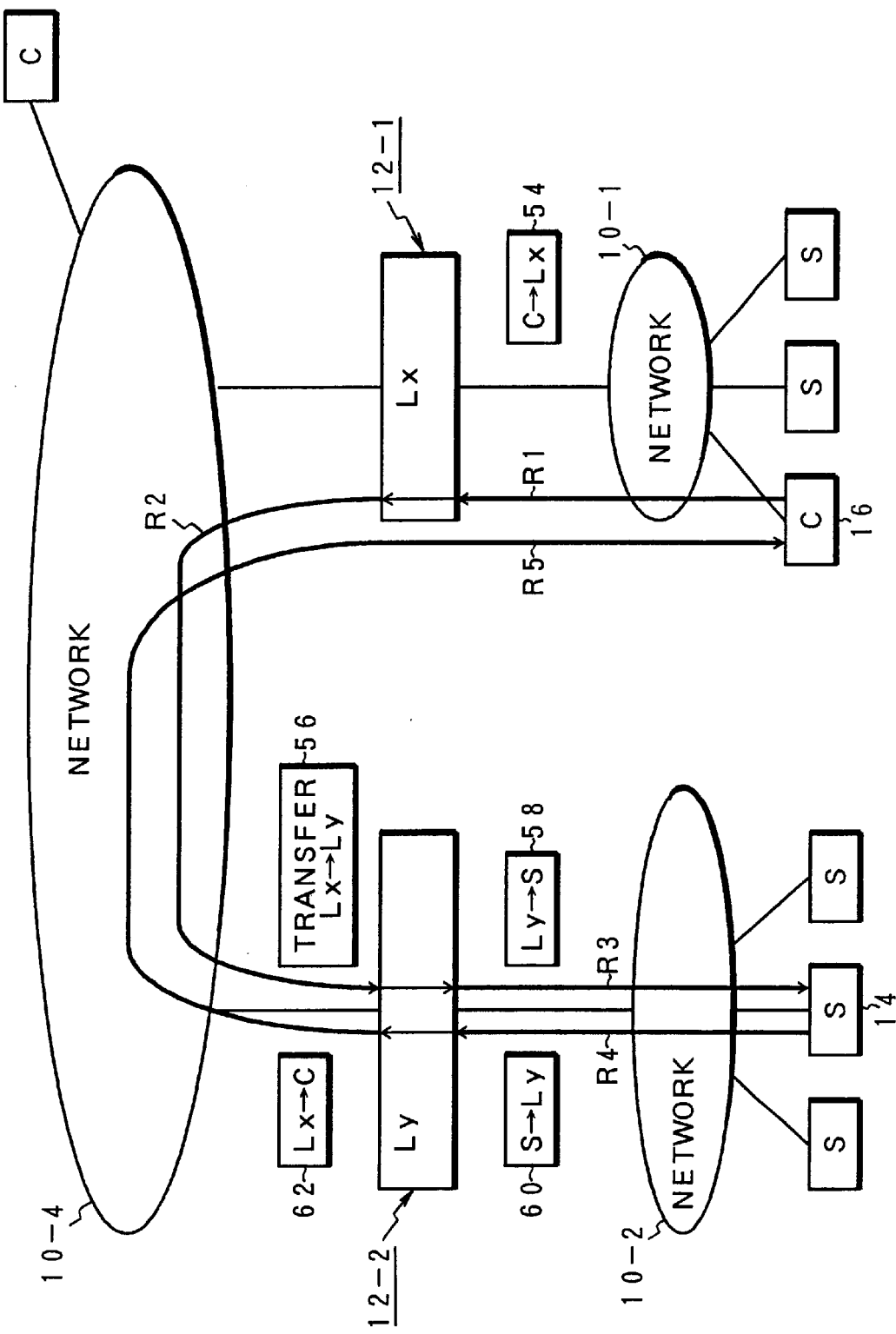
FIG. 15 is an explanatory diagram of the service allocation processing performed when a service demand is received from a client of its own network in FIG. 6.

FIG. 15 shows the other processing actions effected in the service allocation processing in accordance with the address conversion rule 2 of FIG. 7, the difference lying in that the service demand is issued from the client 16 belonging to the network 10-1 of the wide area load distribution apparatus 12-1. In this case as well, in the same manner as the case of FIG. 7, a protocol packet 54 sent through the demand route R1 is caused to be contained in transfer packet data by the transferor wide area load distribution apparatus 12-1 and is transferred as a transfer packet 56 through the transfer route R2 to the transferee wide area load distribution apparatus 12-2 of the other network 10-2, in which the protocol packet extracted from the transfer packet 56 is address converted to obtain a protocol packet 58, which in turn is sent to the server 14 to be allocated. A response packet 60 from the server 14 is address converted into a transfer packet 62 by the transferee wide area load distribution apparatus 12-2, the relay packet 62 being sent directly to the client 16 by way of the relay route R5 which does not pass through the transferor wide area load distribution apparatus 12-1.

(Wide Area Load Distribution Processing—Part 2)

Figure 16A:
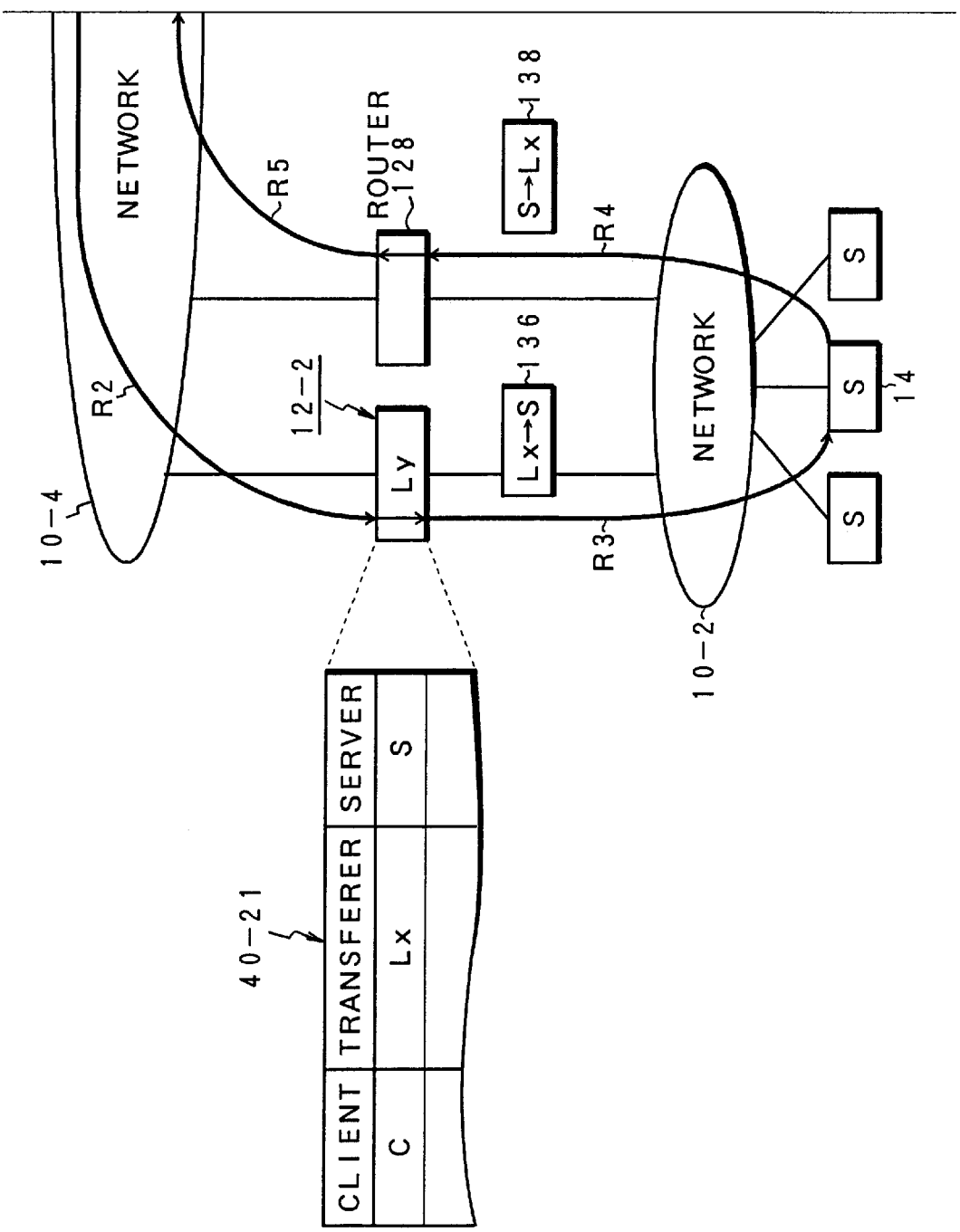

Part 2 of the wide area load distribution processing is characterized in that a response packet from a server to be supplied with a service demand transferred from the client is relayed to the client via the transferor wide area load distribution apparatus 12-1 without passing through the transferee wide area load distribution apparatus 12-2. FIG. 16 is an explanatory diagram of the wide area load distribution processing to which is applied an address conversion rule 3 in which a relay from the server to the client is effected via the transferor without passing through the transferee. The address conversion rule 3 is as follows.

[Address Conversion Rule 3 (Allocation to Other Network Sever)]

I) Transfer Packet Reception extraction of client packet from transfer packet conversion of destination from transferor address Lx to server address S conversion of sender from client address C to self address (transferee address) Ly (pre-conversion sender/post-conversion sender→pre-conversion destination/post-conversion destination)= (C/Lx→Lx/S)

II) Sever Packet Reception conversion of destination from self address (transferor address) Lx to client address C conversion of sender from server address S to self address (transferor address) Lx (pre-conversion sender/post-conversion sender→pre-conversion destination/post-conversion destination)= (S/Lx→Lx/C)

Referring to FIG. 16, the client 16 transfers a client packet 132 through the demand route R1 to the wide area load distribution apparatus 12-1, in which a transfer packet 134 containing a client packet 132 in the form of transfer data is created and is transferred via the transfer route R2 to the other wide area load distribution apparatus 12-2. At that time, the transferor wide area load distribution apparatus 12-1 opens a port px for receiving a relay packet from the server and enters the port number of this open port px and the client address into the connection management table 40-11 shown on the right side in an enlarged scale. The transferee wide area load distribution apparatus 12-2 fetches the client packet 132 from the transfer packet 134, acquires the allocated server address S from the load information if it is in connection demand, and transfers the address converted client packet 136 via the network 10-2 to the server 14 to be allocated. The transferor address of the protocol packet 136 for the server 14 is converted into the transferor address Lx, instead of the transferee address Ly to which an actual transfer is made. Upon the reception of the service demand, the server 14 sends a server packet 138 having the transferor address Lx resulting in the sender as the destination and having the server address S as the sender through the route R4 to a router 128 provided between the network 10-2 and the network 10-4, not to the transferee wide area load distribution apparatus 12-2, with a relay packet 140 being relayed to the transferor wide area load distribution apparatus 12-1 through the relay route R5 passing through the network 10-4. The relay route R5 of the relay packet 140 passes through a security device 130 anterior to the transferor wide area load distribution apparatus 12-1. The security device 130 checks the incorrect address of the transfer packet, and if it finds out an incorrect address, regards as an incorrect access to compulsorily terminate the packet transfer.

In the relay packet 62 of the address conversion rule 2 of FIG. 7 herein, the sender address is a transferor address Lx, not the transferee address Ly which is the actual sender. For this reason, the incorrect address is discriminated when passing through the security device 130, which will release the service. However, in the relay packets 138 and 140 in accordance with an address conversion rule 3 of FIG. 16, the sender is the server address S which is the actual sender, and the destination address is the transferee address Lx which is the actual destination, which will prevent the incorrect address check of the security device 130 from acting thereon. Thus, a transfer is made to the port px in the open state of the transferor wide area load distribution apparatus 12-1, and an address conversion is made as a relay packet 142 for the sending to the client through the relay route R6.

Figure 17A:
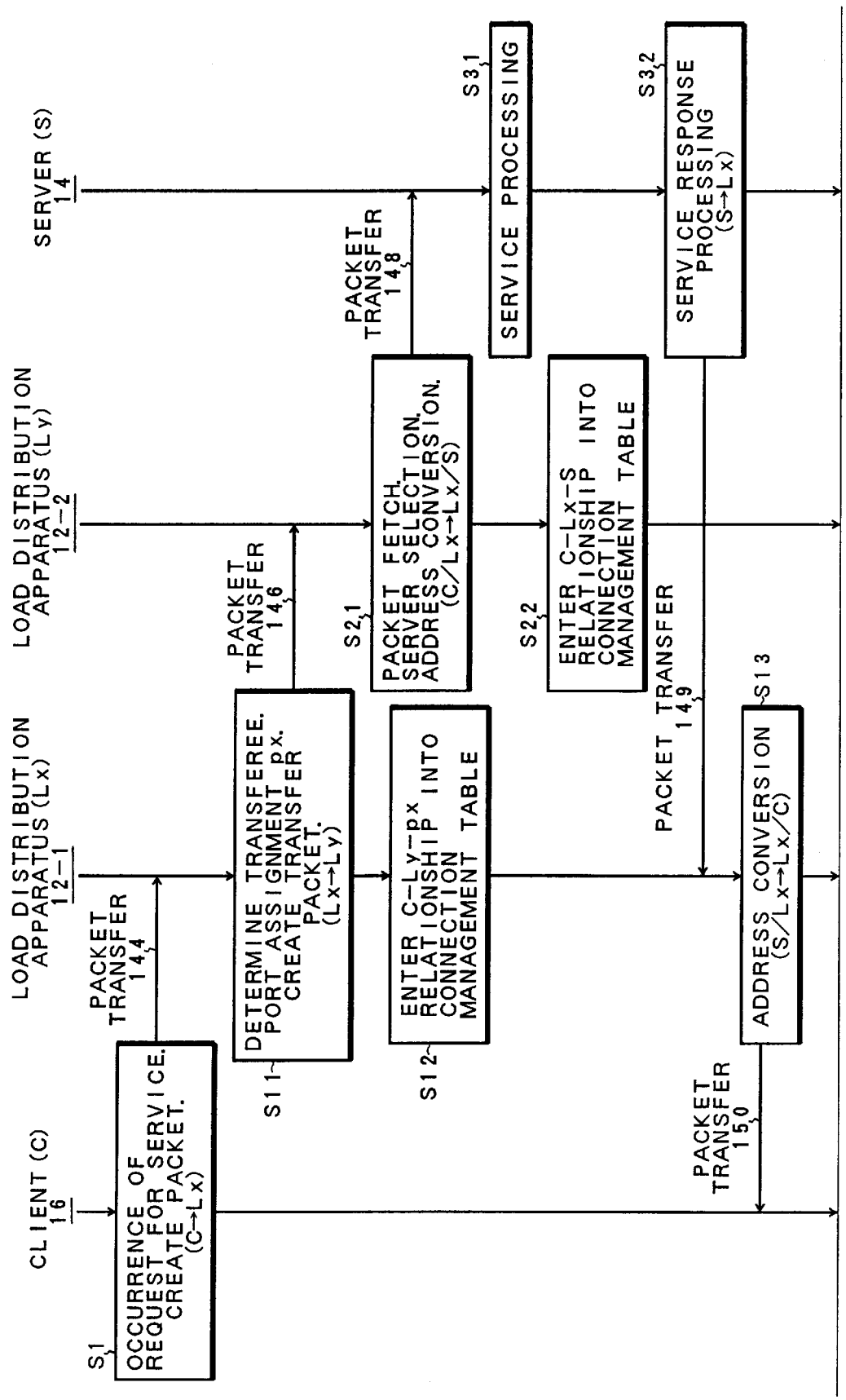

FIGS. 17A and 17B are time charts of the service allocation processing in accordance with the address conversion rule 3 of FIG. 16, which differs from the case of the address conversion rule 2 of FIGS. 10A and 10B in that when the transferor wide area load distribution apparatus 12-1 receives a client packet from the client 16 in step S11, it creates a transfer packet for sending after opening a port whose port number px has been subjected to the port allocation upon the determination as the transferee of the wide area load distribution apparatus 12-2 of the other network and in that it enters the relationship between the client C and the port number being in the open state in step S12. A further difference from the address conversion rule 2 of FIGS. 10A and 10B lies in that a packet transfer 148 following the service response processing starting from the step S2 of the server 14 is made for the transferor wide area load distribution apparatus 12-1. Naturally, a further difference also lies in that the address conversions upon the transfer packet reception and upon the server packet reception in the steps S21, S13, S23, and S15 conform to the above address conversion rule 3.

Figure 18A:
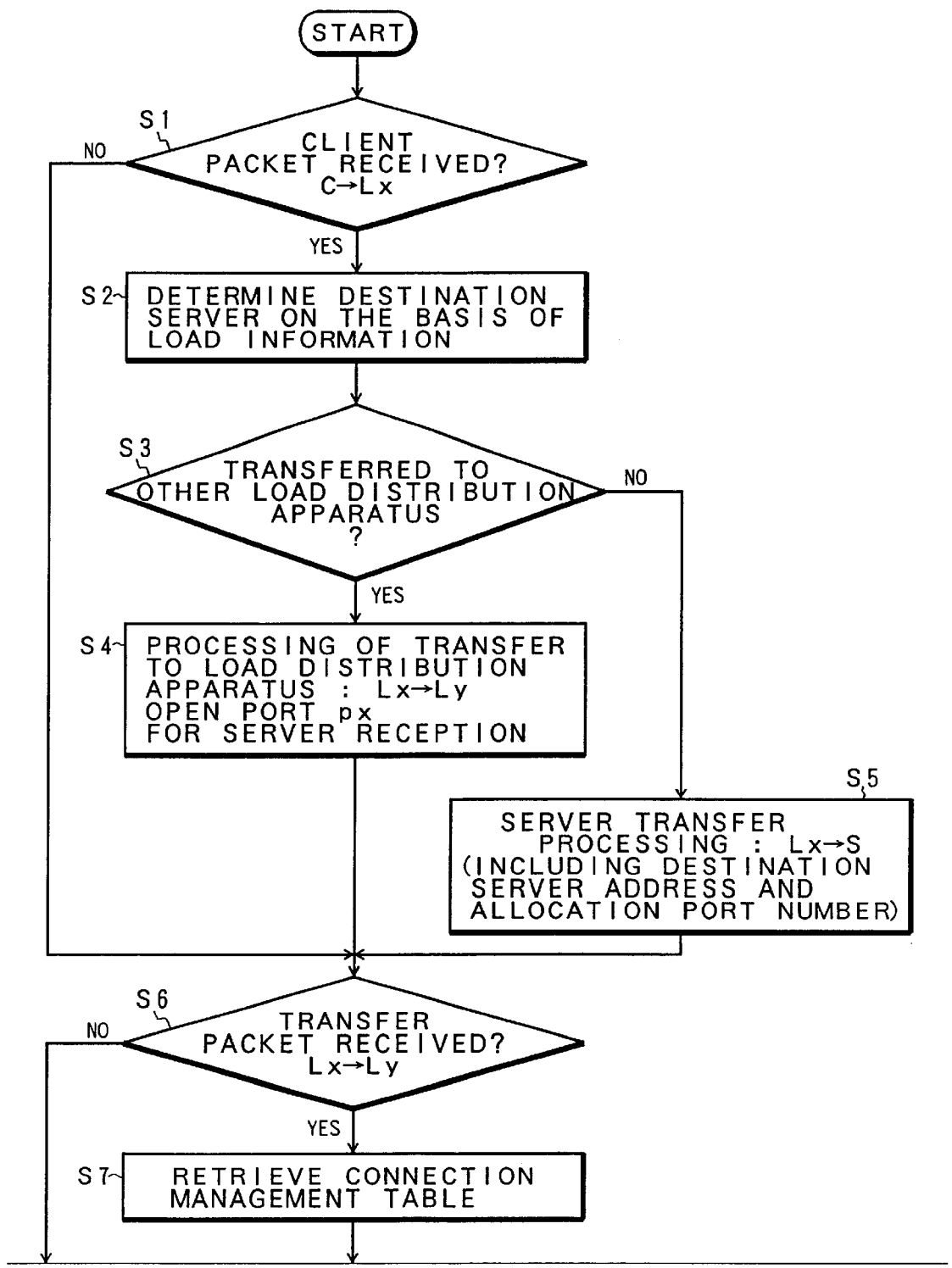
FIGS. 18A and 18B are flowcharts of the service allocation processing of FIG. 1.
Figure 18B:
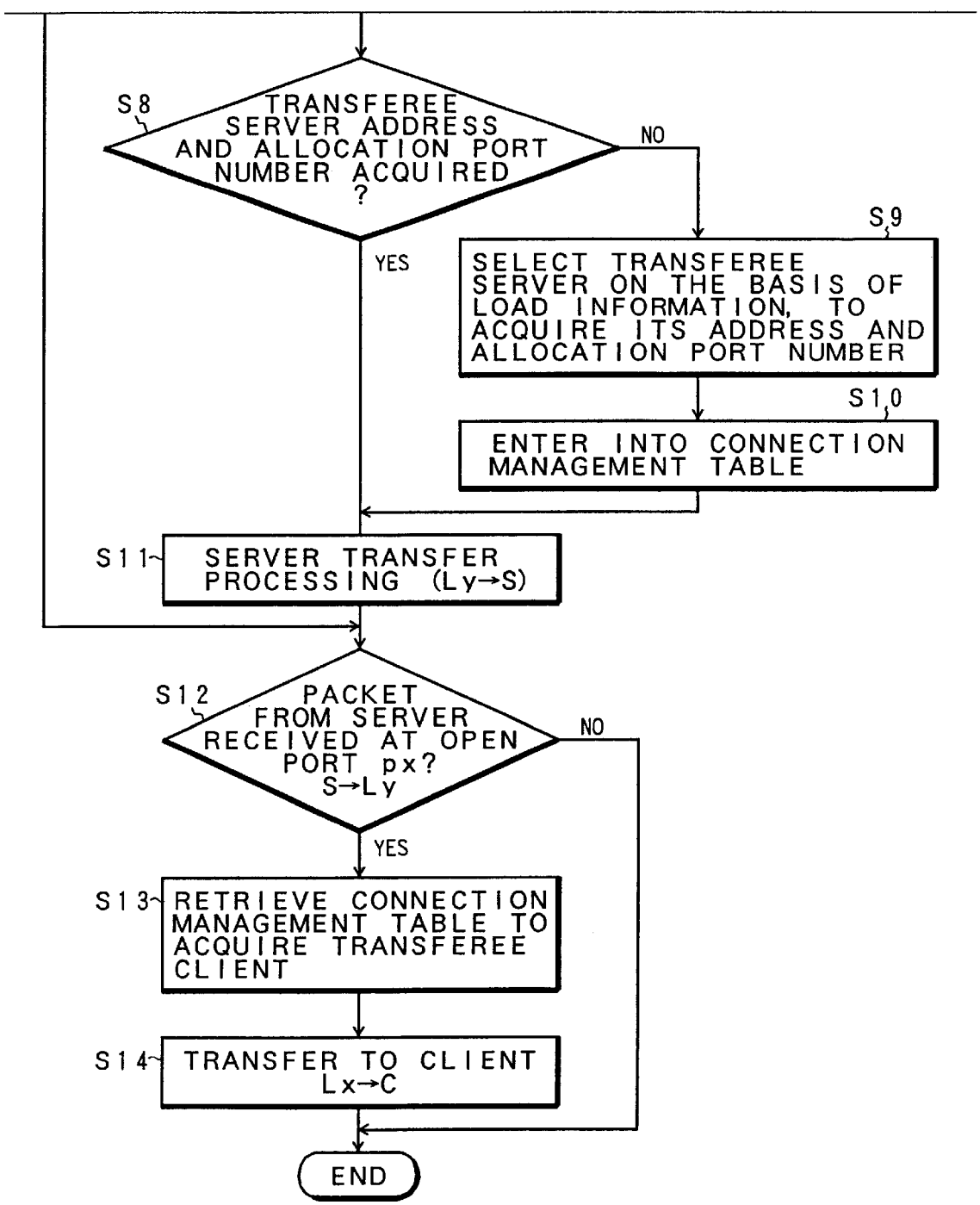
Figure 19:
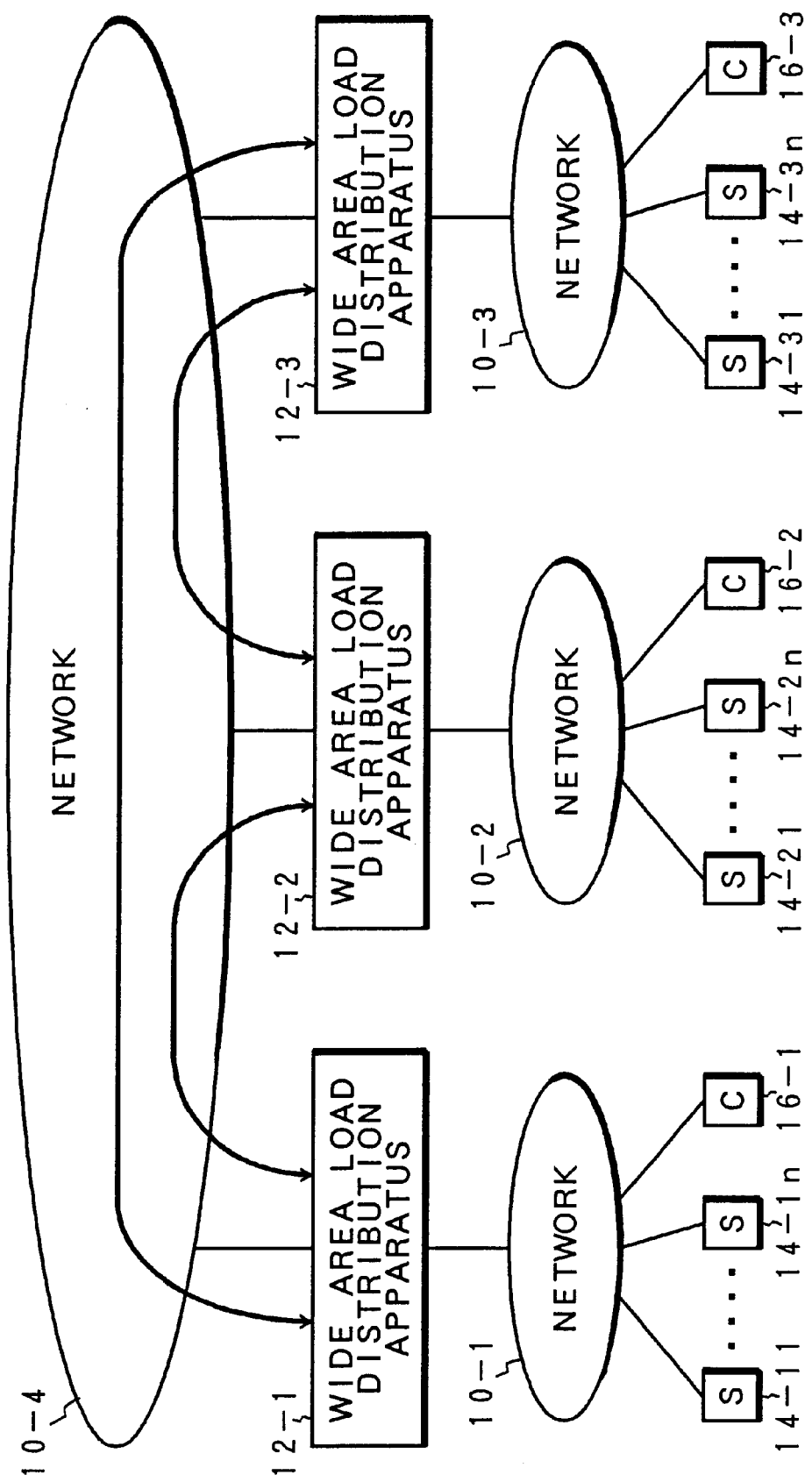
FIG. 19 is an explanatory diagram of a first embodiment of load information interchange processing performed in the present invention.

FIGS. 18A and 18B are flowcharts of the service allocation processing in the case where the address conversion rule 3 of FIGS. 17A and 17B has been used. In case a server of its own network is selected as the service allocated server in response to the service demand from the client, the address conversion rule 1 of FIG. 6 is used. This flowchart also differs from the flowchart of FIGS. 11A and 11B in that upon the packet transfer in step S4 the port px for the server reception is opened and the client and the port px are entered into the connection management table. Another difference lies also in that the server transfer of the steps S11 and S14 and the address conversion in the client relay transfer conform to the address conversion rule 3. The other respects are basically the same as the case of the address conversion rule 2 of FIGS. 11A and 11B. Description is then made of processing by which the address conversion rule 1 for allocating the service to the server of its own network of FIG. 6 in the service allocation processing of the present invention results in the address conversion common to the address conversion rules 2 and 3 for allocating the service to the server of the other network.

In the address conversion rule 2 of FIG. 7, upon the reception of the transfer packet, the address conversion in the form of (C/Ly→Lx/S)

is carried out. On the other hand, the address conversion upon the client packet reception in the address conversion rule 1 of FIG. 6 is given as (C/Lx→Lx/S)

Thus, in order to implement the same address conversion as the address conversion of the address conversion rule 2 by the address conversion rule 1, the address of the wide area load distribution apparatus 12-1 should be the transferor address and the transferee address in case the server of its own network has been selected as the allocated server as in FIG. 6. More specifically, if the server of its own network has been selected as the allocated server, then the address conversion rule 2 is used with transferee address Ly=transferor address Lx so that the same address conversion as the address conversion (C/Lx→Lx/S) upon the client package reception in the address conversion rule 1 can be achieved. The address conversion upon the server packet reception in the address conversion rule 1 is (S/Lx→Lx/C), which will result in the same address conversion as the case of Ly=Lx for the address conversion (S/Lx→Ly/C) upon the server packet reception in the address conversion rule 2. In other words, if the server of its own network of FIG. 6 has been selected as the service allocated server, then the address conversion upon the transfer packet reception and the address conversion upon the server packet reception in the address conversion rule 2 of FIG. 7 are respectively replaced by the relationship transferee address Ly=transferor address Lx so that the address conversion upon the client packet reception and the server packet reception in the address conversion rule 1 can be implemented, thereby making it to employ the common address conversion mechanism for the address conversion rule 1 and the conversion rule 2.

Furthermore, in the address conversion rule 3 of FIGS. 17A and 17B, the address conversion (C/Lx→Lx/S) upon the transfer packet reception is the same as the address conversion upon the client packet reception in the address conversion rule 1, whereas the address conversion (S/Lx→Lx/C) upon the server packet reception in the address conversion rule 3 is the same as the address conversion upon the server packet reception in the address conversion rule 1, thereby making it possible to directly employ the common address conversion mechanism for the address conversion rule 1 and the address conversion rule 3.

(Load Information Management Processing)

The load information for use in the server allocation in the wide area load distribution apparatuses 12-1 to 12-3 of FIG. 1 is processed by the load information transmission unit 26, the load information reception unit 28, the load information management unit 42 and the load information table 44 of FIGS. 2 and 3. For this processing, the wide area load distribution apparatuses 12-1 to 12-3 interchanges the load information with each other by way of the network 10-4 and use their respective load information management units 42 for the update and entry into the load information table 44. As used herein, the load information means information acting as a reference when the wide area load distribution apparatus which has received a service demand from the client selects a wide area load distribution apparatus provided in the other network, and can be for example I) the number of non-high-load servers;
II) the number of transferable connections;
III) the number of transfer permissions and prohibitions; and
IV) conversion value of server load Instead of the number of servers belonging to each wide area load distribution apparatus 12-1 to 12-3, each wide area load distribution apparatus 12-1 to 12-3 may be regarded as one server for the server selection. Alternatively, when all the servers provided in its own network have resulted in high load or have come to a stop due to inspections or failures, selection may be made of the other network wide area load distribution apparatus as the allocation target. The mutual transmissions of the load information among the wide area load distribution apparatuses 12-1 to 12-3 are performed by the load information transmission unit 26 of FIG. 3. The transmission of the load information by the load information transmission unit 26 may be performed periodically or upon the update of the load information. Also, the target to send the load information may be a predetermined wide area load distribution apparatus or may be a wide area load distribution apparatus which has issued the load information. The load information sent from the other wide area load distribution apparatus is received by the load information reception unit 28 of FIG. 3. Each time the load information reception unit 28 receives the load information, the load information management unit 42 updates the load information table 44, with the result that the received load information can be reflected on the allocation processing in the server allocation unit 32. For example, the load information reception unit 28 receives the number of non-high-load servers from the other wide area load distribution apparatus, the wide area load distribution apparatus which is the load information sender is entered as the allocation candidate into the load information table 44 if it has not yet been entered, and the load information such as the number of the non-high-load servers is also updated. Furthermore, if a transfer prohibition has been received as load information from the other wide area load distribution apparatus, the associated wide area load distribution apparatus is excludes from the allocation candidate group.

Figure 20:
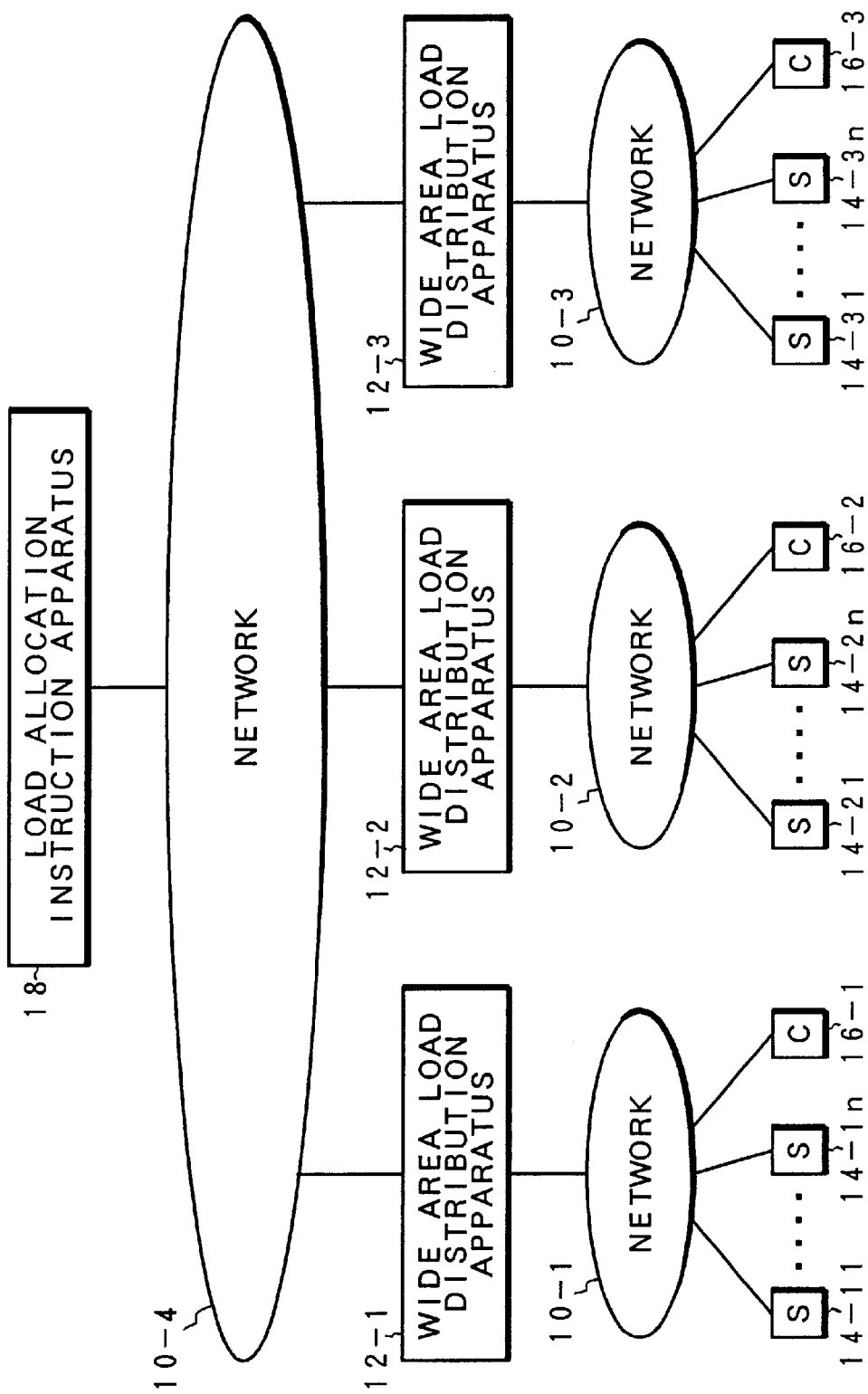
FIG. 20 is an explanatory diagram of a second embodiment of load information interchange processing performed in the present invention.

FIG. 20 shows a further embodiment of the load information management processing effected in the wide area load distribution apparatus of the present invention, which is characterized in that a load allocation instruction apparatus 18 for collectively managing the load information is separately provided for each of the wide area load distribution apparatuses 12-1 to 12-3. In this case, the wide area load distribution apparatuses 12-1 to 12-3 send the load information to only the load allocation instruction apparatus 18, whereas when receiving the load information for the update of the load information the load allocation instruction apparatus 18 sends the updated load information to each wide area load distribution apparatus 12-1 to 12-3. By collectively managing the load information for the plurality of wide area load distribution apparatuses 12-1 to 12-3 by the load allocation instruction apparatus 18 in this manner, it is possible to prevent the load of the network from increasing due to the mutual transmission and reception of the load information among the wide area load distribution apparatuses 12-1 to 12-3 and to enhance the flexibility and extensibility of the management cost and load information through the centralized management of the load information.

Figure 21:
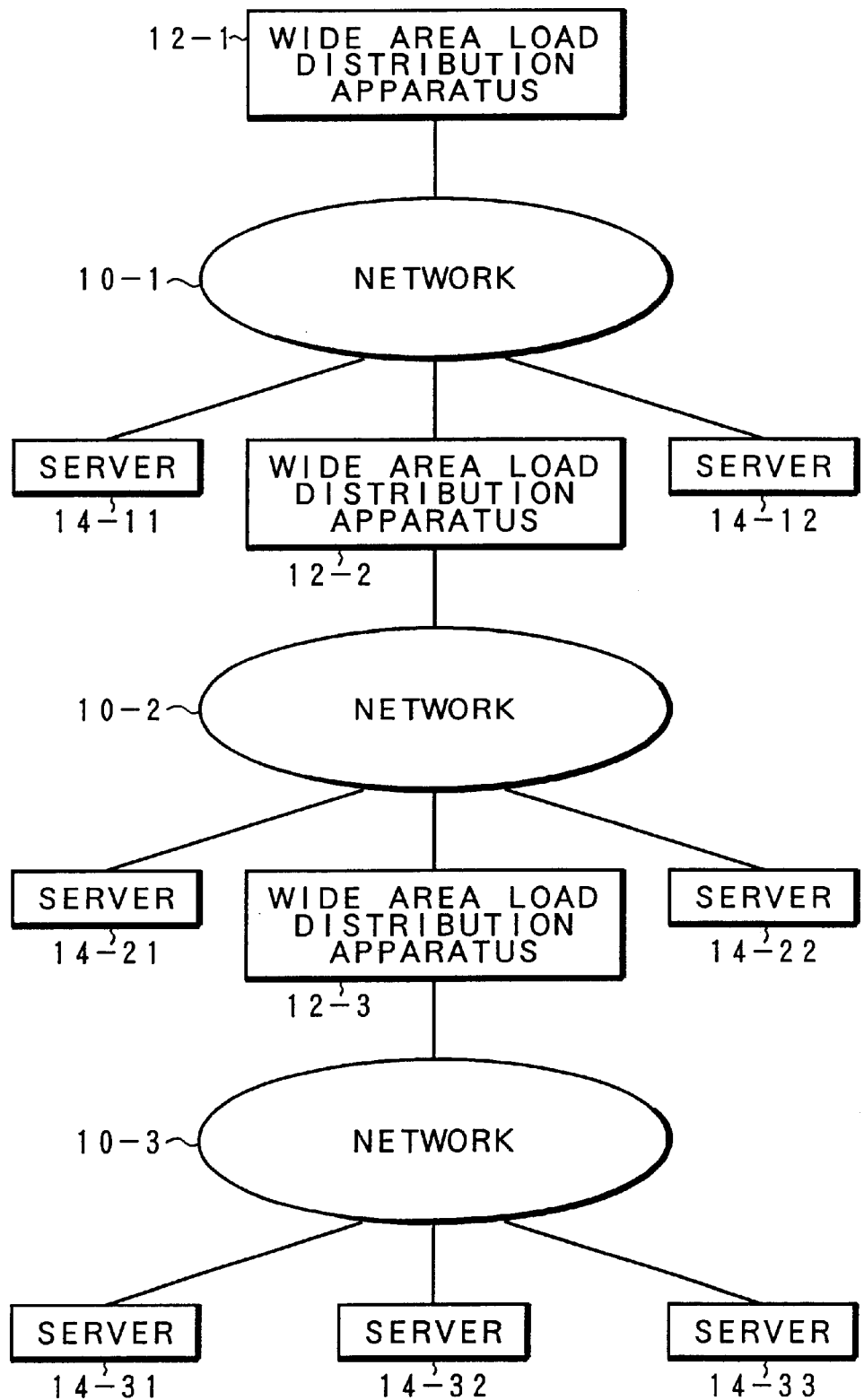
FIG. 21 is an explanatory diagram of series connection of the wide area load distribution apparatuses of the present invention with respect to the networks.

FIG. 21 shows a further embodiment of the network configuration using the wide area load distribution apparatus of the present invention. This network configuration is characterized in that for example three networks 10-1 to 10-3 are connected in series with one another by their respective wide area load distribution apparatus 12-1 and 12-2. This configuration of series connection of the networks by way of the wide area load distribution apparatuses has an advantage that in case of larger scale of the networks or in case of a greater number of servers to be allocated, the load distribution can be shared by the network 10-1 and the network 10-2.

According to the present invention as set forth hereinabove, there can be achieved a load distribution and a failure concealment among the servers belonging to different networks, thereby imposing no restriction on the server disposing sites which are the objects of load distribution, whereby it is possible to realize allocation processing for load distribution over a wide area having a higher flexibility and extensibility and to enhance the effective utilization and service stability of the network servers.

Although in the above embodiments three wide area load distribution apparatuses have been provided for the plurality of networks by way of example, the present invention will be effective as long as at least two wide area load distribution apparatuses are provided. It is to be appreciated that the present invention involves all variants insofar as its objects and advantages are not impaired and that the present invention is not limited to any particular numerical values shown in the above embodiments.

What is claimed is:

1. A wide area load distribution apparatus which allocates services provided to clients by a plurality of servers existing in different networks, depending on a load state of the servers, said apparatus comprising:

a server allocation unit allocating a service for a client packet from a client to a server coupled to a first network of said server allocation unit or a server of a second network which is selected on the basis of load information;

a transfer transmission unit creating a transfer packet containing the client packet in the form of transfer data when said server allocation unit allocates the service to the server of the second network, to transfer the transfer packet by a predetermined transfer protocol to a wide area load distribution apparatus of the second network;

a transfer reception unit fetching the client packet contained in the transfer packet when the transfer packet is received from the transferor wide area load distribution apparatus of the second network;

a server transfer unit converting destination information of the client packet fetched by said transfer reception unit from a transferor wide area load distribution apparatus address to a server address, and converting a client address included in sender information to a self address for sending to the server of the second network;

a client relay unit converting a self address in the destination information to a client address and converting a server address in the sender information to a transferor wide area load distribution apparatus address for relaying to said client;

a connection management unit holding for each service a correlation for retrieval among a client, a transferee and a server for a packet processed by said server allocation unit, said transfer transmission unit, said transfer reception unit, said server transfer unit and said client transfer unit; and a load information management unit interchanging the load information with the second wide area load distribution apparatus, wherein said connection management unit has a connection management table into which a correlation among a client, a transferor and a server is entered for each service, and wherein upon the reception of a transfer packet in said server transfer unit, a correlation among a sender client address of a client packet fetched from said transfer packet, a transferor apparatus address and a destination server address is entered into said connection management table, wherein said server transfer unit provides said transfer packet with flag information indicative of a service connection demand or in-service, and wherein said server transfer unit when recognizing said service connection demand from said flag information of said relay packet, acquires a new destination server on the basis of load information without retrieving said connection management table, whereas when recognizing in-service from said flag information of said relay packet, said server transfer unit acquires a destination server through the retrieval of said connection management table.

2. A wide area load distribution apparatus according to claim 1, wherein upon the reception of a transfer packet in said transfer reception unit, said server transfer unit retrieves said connection management table from the sender client address and the transferor apparatus address of the client packet fetched from said transfer packet, to thereby acquire a destination server address.

3. A wide area load distribution apparatus according to claim 2, wherein in case said server transfer unit has failed to acquire said destination server address as a result of retrieval of said connection management table, said server transfer unit selects a new destination server on the basis of said load information.

4. A wide area load distribution apparatus according to claim 3, wherein when said server transfer unit has selected a new destination server on the basis of said load information, said connection management unit newly enters into said connection management table a correlation among the sender client address and the transferor apparatus address of the client packet fetched from said transfer packet, and the destination server address selected from said load information.

5. A wide area load distribution apparatus according to claim 1, wherein said load information management unit sends self load information to a load allocation instruction apparatus which collects load information from a plurality of wide area load distribution apparatuses for collective management, said load information management unit acquiring load information of the other wide area load distribution apparatuses from said load allocation instruction apparatus.

6. A wide area load distribution apparatus which allocates services provided to clients by a plurality of servers existing in different networks, depending on a load state of the servers, said apparatus comprising:

a server allocation unit allocating a service for a client packet from a client to a server coupled to a first network of said server allocation unit or a server of a second network which is selected on the basis of load information;

a transfer transmission unit creating a transfer packet containing the client packet in the form of transfer data when said server allocation unit allocates the service to the server of the second network, to transfer the transfer packet by a predetermined transfer protocol to a wide area load distribution apparatus of the second network;

a transfer reception unit fetching the client packet contained in the transfer packet when the transfer packet is received from the transferor wide area load distribution apparatus of the second network;

a server transfer unit converting destination information of the client packet fetched by said transfer reception unit from a transferor wide area load distribution apparatus address to a server address, and converting a client address included in sender information to a transferor wide area load distribution apparatus address for sending to the server of the second network;

a client relay unit converting a self address in the destination information to a client address and converting a server address in the sender information to a self address for relaying to said client;

a connection management unit holding for each service a correlation for retrieval among a client, a transferee and a sever for a packet processed by said server allocation unit, said server transfer unit and said client transfer unit; and a load information management unit interchanging the load information with the second wide area load distribution apparatus.

7. A wide area load distribution apparatus according to claim 6, wherein said client address, server address and apparatus address each include a port number.

8. A wide area load distribution method in which each network is provided with a wide area load distribution apparatus and in which services provided to clients by a plurality of servers existing in different networks are allocated depending on a load state of the servers, said method comprising:

a server allocation step allocating a service for a client packet from a client to a server coupled to a first network of said server allocation unit or a server of a second network which is selected on the basis of load information;

a transfer transmission step creating a transfer packet containing the client packet in the from of transfer data when the service is allocated to the server of the second network in said server allocation step, to transfer the transfer packet by a predetermined transfer protocol to a wide area load distribution apparatus of the second network;

a transfer reception step fetching the client packet contained in the transfer packet when the transfer packet is received from the transferor wide area load distribution apparatus of the second network;

a server transfer step converting destination information of the client packet fetched in said transfer reception step from a transferor wide area load distribution apparatus address to a sever address, and converting a client address included in sender information to a self address for sending to the server of the second network;

a client relay step converting a self address in the destination information to a client address and converting a server address in the sender information to a transferor wide area load distribution apparatus address for relaying to said client;

a connection management step holding for each service a correlation for retrieval among a client, a transferee and a server for a packet processed in said server allocation step, said transfer transmission step, said transfer reception step, said server transfer step and said client transfer step; and a load information management step interchanging the load information with the second wide area load distribution apparatus, wherein said connection management unit has a connection management table into which a correlation among a client, a transferor and a server is entered for each service, and wherein upon the reception of a transfer packet in said server transfer unit, a correlation among a sender client address of a client packet fetched from said transfer packet, a transferor apparatus address and a destination server address is entered into said connection management table, wherein said server transfer unit provides said transfer packet with flag information indicative of a service connection demand or in-service, and wherein said server transfer unit when recognizing said service connection demand from said flag information of said relay packet, acquires a new destination server on the basis of load information without retrieving said connection management table, whereas when recognizing in-service from said flag information of said relay packet, said server transfer unit acquires a destination server through the retrieval of said connection management table.

9. A wide area load distribution method in which each network is provided with a wide area load distribution apparatus and in which services provided to clients by a plurality of servers existing in different networks are allocated depending on a load state of the servers, said method comprising:

a server allocation step allocating a service for a client packet from a client to a server coupled to a first network of said server allocation unit or a server of a second network which is selected on the basis of load information;

a transfer transmission step creating a transfer packet containing the client packet in the form of transfer data when the service is allocated to the server of the second network in said server allocations step, to transfer the transfer packet by a predetermined transfer protocol to a wide area load distribution apparatus of the second network;

a transfer reception step fetching the client packet contained in the transfer packet when the transfer packet is received from the transferor wide area load distribution apparatus of the second network;

a server transfer step converting destination information from a transferor wide area load distribution apparatus address to a server address, and converting a client address included in sender information to a transferor wide area load distribution apparatus address for sending to the server of the second network;

a client relay step converting a self address in the destination information to a client address and converting a server address in the sender information to a self address for relaying to said client;

a connection management step holding for each service a correlation for retrieval among a client, a transferee and a server for a packet processed in said server allocation step, said transfer transmission step, said transfer reception step, said server transfer step and said client transfer step; and a load information management step interchanging the load information with the second wide area load distribution apparatus.

* * * * *